(12) United States Patent
Gschwind et al.

(10) Patent No.: US 9,870,253 B2
(45) Date of Patent: Jan. 16, 2018

(54) ENABLING END OF TRANSACTION DETECTION USING SPECULATIVE LOOK AHEAD

(71) Applicant: International Business Machines Corporation, Armonk, NY (US)

(72) Inventors: Michael Karl Gschwind, Chappaqua, NY (US); Maged M. Michael, Danbury, CT (US); Valentina Salapura, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 307 days.

(21) Appl. No.: 14/722,179

(22) Filed: May 27, 2015

(65) Prior Publication Data
US 2016/0350124 A1    Dec. 1, 2016

(51) Int. Cl.
*G06F 9/30* (2006.01)
*G06F 9/38* (2006.01)
*G06F 9/46* (2006.01)

(52) U.S. Cl.
CPC .......... *G06F 9/466* (2013.01); *G06F 9/3004* (2013.01); *G06F 9/30076* (2013.01); *G06F 9/30087* (2013.01); *G06F 9/3834* (2013.01); *G06F 9/3859* (2013.01); *G06F 9/3863* (2013.01); *G06F 9/467* (2013.01)

(58) Field of Classification Search
CPC ...... G06F 9/3818; G06F 9/382; G06F 9/3842; G06F 9/466; G06F 9/467; G06F 9/30087; G06F 9/3802; G06F 9/3859
See application file for complete search history.

(56) References Cited

U.S. PATENT DOCUMENTS

| 2010/0205408 | A1 | 8/2010 | Chung et al. |
| 2011/0307689 | A1 | 12/2011 | Chung et al. |
| 2012/0159084 | A1 | 6/2012 | Pohlack et al. |
| 2016/0188330 | A1* | 6/2016 | Ould-Ahmed-Vall ............ G06F 9/30098 712/208 |

OTHER PUBLICATIONS

Zhao et al., "SEL-TM: Selective Eager-Lazy Management for Improved Concurrency in Transactional Memory", 2012, IEEE.*

(Continued)

*Primary Examiner* — Benjamin Geib
(74) *Attorney, Agent, or Firm* — James H. Mayfield

(57) ABSTRACT

A transaction within a computer program or computer application comprises program instructions performing multiple store operations that appear to run and complete as a single, atomic operation. The program instructions forming a current transaction comprise a transaction begin indicator, a plurality of instructions (e.g., store operations), and a transaction end indicator. A near-end of transaction indicator is triggered based on a speculative look ahead operation such that an interfering transaction requiring a halt operation may be delayed to allow the current transaction to end. A halt operation, also referred to as an abort operation, as used herein refers to an operation responsive to a condition where two transactions have been detected to interfere where at least one transaction must be aborted and the state of the processor is reset to the state at the beginning of the aborted transaction by performing a rollback.

14 Claims, 8 Drawing Sheets

(56) References Cited

OTHER PUBLICATIONS

Lupon et al., "A Dynamically Adaptable Hardware Transactional Memory", 2010, IEEE.*
Tomic et al., "EazyHTM: Eager-Lazy Hardware Transactional Memory", 2009, ACM.*
Bradbury et al., "Predicting the Length of a Transaction", U.S. Appl. No. 14/191,615, filed Feb. 27, 2014, pp. 1-74.
Bradbury et al., "Indicating Nearing the Completion of a Transaction", U.S. Appl. No. 14/194,769, filed Mar. 2, 2014, pp. 1-77.

* cited by examiner

ENABLING END OF TRANSACTION DETECTION USING SPECULATIVE LOOK AHEAD

BACKGROUND OF THE INVENTION

This disclosure relates generally to transactional memory systems and more specifically to a method, computer program and computer system for improving the efficiency of transactional instruction processing.

The number of central processing unit (CPU) cores on a chip and the number of CPU cores connected to a shared memory continues to grow significantly to support growing workload capacity demand. The increasing number of CPUs cooperating to process the same workloads puts a significant burden on software scalability, for example, shared queues or data structures protected by traditional semaphores become hot spots and lead to sub-linear n-way scaling curves. Traditionally this has been countered by implementing finer-grained locking in software, and with lower latency/higher bandwidth interconnects in hardware. Implementing fine-grained locking to improve software scalability can be very complicated and error-prone, and at today's CPU frequencies, the latencies of hardware interconnects are limited by the physical dimension of the chips and systems, and by the speed of light.

Implementations of hardware Transactional Memory (HTM, or in this discussion, simply TM) have been introduced, wherein a group of instructions—called a transaction—operate in an atomic manner on a data structure in memory, as viewed by other central processing units (CPUs) and the I/O subsystem (atomic operation is also known as "block concurrent" or "serialized" in other literature). The transaction executes optimistically without obtaining a lock, but may need to abort and retry the transaction execution if an operation, of the executing transaction, on a memory location conflicts with another operation on the same memory location. Previously, software transactional memory implementations have been proposed to support software Transactional Memory (TM). However, hardware TM can provide improved performance aspects and ease of use over software TM.

U.S. Patent Application Publication US20080244354 A1 titled "Apparatus and method for redundant multi-threading with recovery" filed 2007 Mar. 28 and incorporated by reference herein teaches a method and apparatus for reducing the effect of soft errors in a computer system is provided. Soft errors are detected by combining software redundant threading and instruction duplication. Upon detection of a soft error, errors are recovered through the use of software check pointing/rollback technology. Reliable regions are identified by vulnerability profiling and redundant multi-threading is applied to the identified reliable regions.

U.S. Patent Application Publication US20120210162 A1 titled "State recovery and lockstep execution restart in a system with multiprocessor pairing" filed 2011 Feb. 15 and incorporated by reference herein teaches a system, method and computer program product for a multiprocessing system to offer selective pairing of processor cores for increased processing reliability. A selective pairing facility is provided that selectively connects, i.e., pairs, multiple microprocessor or processor cores to provide one highly reliable thread (or thread group). Each paired microprocessor or processor cores that provide one highly reliable thread for high-reliability connect with a system components such as a memory "nest" (or memory hierarchy), an optional system controller, and optional interrupt controller, optional I/O or peripheral devices, etc. The memory nest is attached to a selective pairing facility via a switch or a bus. Each selectively paired processor core is includes a transactional execution facility, wherein the system is configured to enable processor rollback to a previous state and reinitialize lockstep execution in order to recover from an incorrect execution when an incorrect execution has been detected by the selective pairing facility.

SUMMARY

According to an aspect of the present invention, there is a method, computer program product, and/or system for enabling end of transaction detection using speculative look ahead that performs the following steps (not necessarily in the following order): (i) setting an indicator to indicate a current transaction is being processed, (ii) monitoring a speculative look ahead operation to detect whether an end-transaction instruction corresponding to the current transaction is likely to occur, and (iii)) responsive to detecting the end-transaction instruction, enabling a near-end-transaction processing mode.

DETAILED DESCRIPTION

Figure 1:
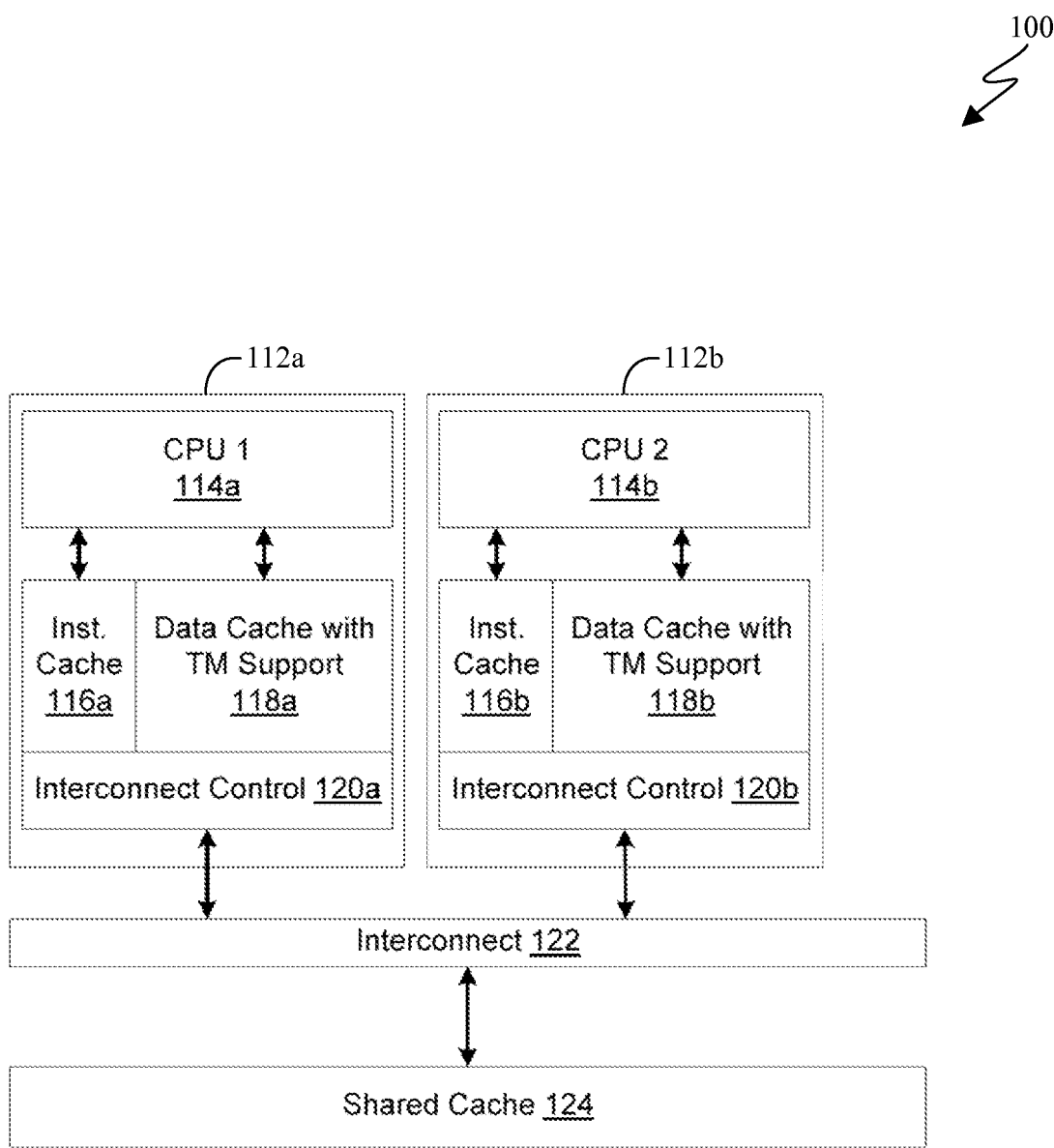
FIG. 1 depicts an example multicore transactional memory environment, in accordance with an illustrative embodiment.

A transaction within a computer program or computer application comprises program instructions performing multiple store operations that appear to run and complete as a single, atomic operation. The program instructions forming a current transaction comprise a transaction begin indicator, a plurality of instructions (e.g., store operations), and a transaction end indicator. A near-end of transaction indicator is triggered based on a speculative look ahead operation, and enabling near-end-transaction processing mode, such that an interfering transaction requiring a halt operation may be delayed to allow the current transaction to end. A halt operation, also referred to as an abort operation, as used herein refers to an operation responsive to a condition where two transactions have been detected to interfere where at least one transaction must be aborted and the state of the processor is reset to the state at the beginning of the aborted transaction by performing a rollback. This Detailed Description section is divided into the following subsections: (i) The Hardware and Software Environment; (ii) Example Embodiment; (iii) Further Comments and/or Embodiments; and (iv) Definitions.

I. The Hardware and Software Environments

The present invention may be a system, a method, and/or a computer program product. The computer program product may include a computer readable storage medium (or media) having computer readable program instructions thereon for causing a processor to carry out aspects of the present invention.

A. Transaction Execution Environment

Historically, a computer system or processor had only a single processor (aka processing unit or central processing unit). The processor included an instruction processing unit (IPU), a branch unit, a memory control unit and the like. Such processors were capable of executing a single thread of a program at a time. Operating systems were developed that could time-share a processor by dispatching a program to be executed on the processor for a period of time, and then dispatching another program to be executed on the processor for another period of time. As technology evolved, memory subsystem caches were often added to the processor as well as complex dynamic address translation including translation lookaside buffers (TLBs). The IPU itself was often referred to as a processor. As technology continued to evolve, an entire processor could be packaged on a single semiconductor chip or die, such a processor was referred to as a microprocessor. Then processors were developed that incorporated multiple IPUs, such processors were often referred to as multi-processors. Each such processor of a multi-processor computer system (processor) may include individual or shared caches, memory interfaces, system bus, address translation mechanism and the like. Virtual machine and instruction set architecture (ISA) emulators added a layer of software to a processor, that provided the virtual machine with multiple "virtual processors" (aka processors) by time-slice usage of a single IPU in a single hardware processor. As technology further evolved, multi-threaded processors were developed, enabling a single hardware processor having a single multi-thread IPU to provide a capability of simultaneously executing threads of different programs, thus each thread of a multi-threaded processor appeared to the operating system as a processor. As technology further evolved, it was possible to put multiple processors (each having an IPU) on a single semiconductor chip or die. These processors were referred to processor cores or just cores. Thus the terms such as processor, central processing unit, processing unit, microprocessor, core, processor core, processor thread, and thread, for example, are often used interchangeably. Aspects of embodiments herein may be practiced by any or all processors including those shown supra, without departing from the teachings herein. Wherein the term "thread" or "processor thread" is used herein, it is expected that particular advantage of the embodiment may be had in a processor thread implementation.

Transaction Execution in Intel Based Embodiments

In "Intel Architecture Instruction Set Extensions Programming Reference" 319433-012A, February 2012, incorporated herein by reference in its entirety, Chapter 8 teaches, in part, that multithreaded applications may take advantage of increasing numbers of CPU cores to achieve higher performance. (Note: the term "Intel" may be subject to trademark rights in various jurisdictions throughout the world and are used here only in reference to the products or services properly denominated by the marks to the extent that such trademark rights may exist.) However, the writing of multi-threaded applications requires programmers to understand and take into account data sharing among the multiple threads. Access to shared data typically requires synchronization mechanisms. These synchronization mechanisms are used to ensure that multiple threads update shared data by serializing operations that are applied to the shared data, often through the use of a critical section that is protected by a lock. Since serialization limits concurrency, programmers try to limit the overhead due to synchronization.

Intel Transactional Synchronization Extensions (Intel TSX) allow a processor to dynamically determine whether threads need to be serialized through lock-protected critical sections, and to perform that serialization only when required. (Note: the term(s) "Intel," "TSX," and/or "Intel TSX" may be subject to trademark rights in various jurisdictions throughout the world and are used here only in reference to the products or services properly denominated by the marks to the extent that such trademark rights may exist.) This allows the processor to expose and exploit concurrency that is hidden in an application because of dynamically unnecessary synchronization.

With Intel TSX, programmer-specified code regions (also referred to as "transactional regions" or just "transactions") are executed transactionally. If the transactional execution completes successfully, then all memory operations performed within the transactional region will appear to have occurred instantaneously when viewed from other processors. A processor makes the memory operations of the executed transaction, performed within the transactional region, visible to other processors only when a successful commit occurs, i.e., when the transaction successfully completes execution. This process is often referred to as an atomic commit.

Intel TSX provides two software interfaces to specify regions of code for transactional execution. Hardware Lock Elision (HLE) is a legacy compatible instruction set extension (comprising the XACQUIRE and XRELEASE prefixes) to specify transactional regions. Restricted Transactional Memory (RTM) is a new instruction set interface (comprising the XBEGIN, XEND, and XABORT instructions) for programmers to define transactional regions in a more flexible manner than that possible with HLE. HLE is for programmers who prefer the backward compatibility of the conventional mutual exclusion programming model and would like to run HLE-enabled software on legacy hardware but would also like to take advantage of the new lock elision capabilities on hardware with HLE support. RTM is for programmers who prefer a flexible interface to the transactional execution hardware. In addition, Intel TSX also provides an XTEST instruction. This instruction allows software to query whether the logical processor is transactionally executing in a transactional region identified by either HLE or RTM.

Since a successful transactional execution ensures an atomic commit, the processor executes the code region optimistically without explicit synchronization. If synchronization was unnecessary for that specific execution, execution can commit without any cross-thread serialization. If the processor cannot commit atomically, then the optimistic execution fails. When this happens, the processor will roll back the execution, a process referred to as a transactional abort. On a transactional abort, the processor will discard all updates performed in the memory region used by the transaction, restore architectural state to appear as if the optimistic execution never occurred, and resume execution non-transactionally.

A processor can perform a transactional abort for numerous reasons. A primary reason to abort a transaction is due to conflicting memory accesses between the transactionally executing logical processor and another logical processor. Such conflicting memory accesses may prevent a successful transactional execution. Memory addresses read from within a transactional region constitute the read-set of the transactional region and addresses written to within the transactional region constitute the write-set of the transactional region. Intel TSX maintains the read- and write-sets at the granularity of a cache line. A conflicting memory access occurs if another logical processor either reads a location that is part of the transactional region's write-set or writes a location that is a part of either the read- or write-set of the transactional region. A conflicting access typically means that serialization is required for this code region. Since Intel TSX detects data conflicts at the granularity of a cache line, unrelated data locations placed in the same cache line will be detected as conflicts that result in transactional aborts. Transactional aborts may also occur due to limited transactional resources. For example, the amount of data accessed in the region may exceed an implementation-specific capacity. Additionally, some instructions and system events may cause transactional aborts. Frequent transactional aborts result in wasted cycles and increased inefficiency.

Hardware Lock Elision

Hardware Lock Elision (HLE) provides a legacy compatible instruction set interface for programmers to use transactional execution. HLE provides two new instruction prefix hints: XACQUIRE and XRELEASE.

With HLE, a programmer adds the XACQUIRE prefix to the front of the instruction that is used to acquire the lock that is protecting the critical section. The processor treats the prefix as a hint to elide the write associated with the lock acquire operation. Even though the lock acquire has an associated write operation to the lock, the processor does not add the address of the lock to the transactional region's write-set nor does it issue any write requests to the lock. Instead, the address of the lock is added to the read-set. The logical processor enters transactional execution. If the lock was available before the XACQUIRE prefixed instruction, then all other processors will continue to see the lock as available afterwards. Since the transactionally executing logical processor neither added the address of the lock to its write-set nor performed externally visible write operations to the lock, other logical processors can read the lock without causing a data conflict. This allows other logical processors to also enter and concurrently execute the critical section protected by the lock. The processor automatically detects any data conflicts that occur during the transactional execution and will perform a transactional abort if necessary.

Even though the eliding processor did not perform any external write operations to the lock, the hardware ensures program order of operations on the lock. If the eliding processor itself reads the value of the lock in the critical section, it will appear as if the processor had acquired the lock, i.e. the read will return the non-elided value. This behavior allows an HLE execution to be functionally equivalent to an execution without the HLE prefixes.

An XRELEASE prefix can be added in front of an instruction that is used to release the lock protecting a critical section. Releasing the lock involves a write to the lock. If the instruction is to restore the value of the lock to the value the lock had prior to the XACQUIRE prefixed lock acquire operation on the same lock, then the processor elides the external write request associated with the release of the lock and does not add the address of the lock to the write-set. The processor then attempts to commit the transactional execution.

With HLE, if multiple threads execute critical sections protected by the same lock but they do not perform any conflicting operations on each other's data, then the threads can execute concurrently and without serialization. Even though the software uses lock acquisition operations on a common lock, the hardware recognizes this, elides the lock, and executes the critical sections on the two threads without requiring any communication through the lock—if such communication was dynamically unnecessary.

If the processor is unable to execute the region transactionally, then the processor will execute the region non-transactionally and without elision. HLE enabled software has the same forward progress guarantees as the underlying non-HLE lock-based execution. For successful HLE execution, the lock and the critical section code must follow certain guidelines. These guidelines only affect performance; and failure to follow these guidelines will not result in a functional failure. Hardware without HLE support will ignore the XACQUIRE and XRELEASE prefix hints and will not perform any elision since these prefixes correspond to the REPNE/REPE IA-32 prefixes which are ignored on the instructions where XACQUIRE and XRELEASE are valid. Importantly, HLE is compatible with the existing lock-based programming model. Improper use of hints will not cause functional bugs though it may expose latent bugs already in the code.

Restricted Transactional Memory (RTM) provides a flexible software interface for transactional execution. RTM provides three new instructions—XBEGIN, XEND, and XABORT—for programmers to start, commit, and abort a transactional execution.

The programmer uses the XBEGIN instruction to specify the start of a transactional code region and the XEND instruction to specify the end of the transactional code region. If the RTM region could not be successfully executed transactionally, then the XBEGIN instruction takes an operand that provides a relative offset to the fallback instruction address.

A processor may abort RTM transactional execution for many reasons. In many instances, the hardware automatically detects transactional abort conditions and restarts execution from the fallback instruction address with the architectural state corresponding to that present at the start of the XBEGIN instruction and the EAX register updated to describe the abort status.

The XABORT instruction allows programmers to abort the execution of an RTM region explicitly. The XABORT instruction takes an 8-bit immediate argument that is loaded into the EAX register and will thus be available to software following an RTM abort. RTM instructions do not have any data memory location associated with them. While the hardware provides no guarantees as to whether an RTM region will ever successfully commit transactionally, most transactions that follow the recommended guidelines are expected to successfully commit transactionally. However, programmers must always provide an alternative code sequence in the fallback path to guarantee forward progress. This may be as simple as acquiring a lock and executing the specified code region non-transactionally. Further, a transaction that always aborts on a given implementation may complete transactionally on a future implementation. Therefore, programmers must ensure the code paths for the transactional region and the alternative code sequence are functionally tested.

Detection of HLE Support

A processor supports HLE execution if CPUID.07H.EBX.HLE [bit 4]=1. However, an application can use the HLE prefixes (XACQUIRE and XRELEASE) without checking whether the processor supports HLE. Processors without HLE support ignore these prefixes and will execute the code without entering transactional execution.

Detection of RTM Support

A processor supports RTM execution if CPUID.07H.EBX.RTM [bit 11]=1. An application must check if the processor supports RTM before it uses the RTM instructions (XBEGIN, XEND, XABORT). These instructions will generate a #UD exception when used on a processor that does not support RTM.

Detection of XTEST Instruction

A processor supports the XTEST instruction if it supports either HLE or RTM. An application must check either of these feature flags before using the XTEST instruction. This instruction will generate a #UD exception when used on a processor that does not support either HLE or RTM.

Querying Transactional Execution Status

The XTEST instruction can be used to determine the transactional status of a transactional region specified by HLE or RTM. Note, while the HLE prefixes are ignored on processors that do not support HLE, the XTEST instruction will generate a #UD exception when used on processors that do not support either HLE or RTM.

Requirements for HLE Locks

For HLE execution to successfully commit transactionally, the lock must satisfy certain properties and access to the lock must follow certain guidelines.

An XRELEASE prefixed instruction must restore the value of the elided lock to the value it had before the lock acquisition. This allows hardware to safely elide locks by not adding them to the write-set. The data size and data address of the lock release (XRELEASE prefixed) instruction must match that of the lock acquire (XACQUIRE prefixed) and the lock must not cross a cache line boundary.

Software should not write to the elided lock inside a transactional HLE region with any instruction other than an XRELEASE prefixed instruction, otherwise such a write may cause a transactional abort. In addition, recursive locks (where a thread acquires the same lock multiple times without first releasing the lock) may also cause a transactional abort. Note that software can observe the result of the elided lock acquire inside the critical section. Such a read operation will return the value of the write to the lock.

The processor automatically detects violations to these guidelines, and safely transitions to a non-transactional execution without elision. Since Intel TSX detects conflicts at the granularity of a cache line, writes to data collocated on the same cache line as the elided lock may be detected as data conflicts by other logical processors eliding the same lock.

Transactional Nesting

Both HLE and RTM support nested transactional regions. However, a transactional abort restores state to the operation that started transactional execution: either the outermost XACQUIRE prefixed HLE eligible instruction or the outermost XBEGIN instruction. The processor treats all nested transactions as one transaction.

HLE Nesting and Elision

Programmers can nest HLE regions up to an implementation specific depth of MAX_HLE_NEST_COUNT. Each logical processor tracks the nesting count internally but this count is not available to software. An XACQUIRE prefixed HLE-eligible instruction increments the nesting count, and an XRELEASE prefixed HLE-eligible instruction decrements it. The logical processor enters transactional execution when the nesting count goes from zero to one. The logical processor attempts to commit only when the nesting count becomes zero. A transactional abort may occur if the nesting count exceeds MAX_HLE_NEST_COUNT.

In addition to supporting nested HLE regions, the processor can also elide multiple nested locks. The processor tracks a lock for elision beginning with the XACQUIRE prefixed HLE eligible instruction for that lock and ending with the XRELEASE prefixed HLE eligible instruction for that same lock. The processor can, at any one time, track up to a MAX_HLE_ELIDED_LOCKS number of locks. For example, if the implementation supports a MAX_HLE_ELIDED_LOCKS value of two and if the programmer nests three HLE identified critical sections (by performing XACQUIRE prefixed HLE eligible instructions on three distinct locks without performing an intervening XRELEASE prefixed HLE eligible instruction on any one of the locks), then the first two locks will be elided, but the third won't be elided (but will be added to the transaction's write-set). However, the execution will still continue transactionally. Once an XRELEASE for one of the two elided locks is encountered, a subsequent lock acquired through the XACQUIRE prefixed HLE eligible instruction will be elided.

The processor attempts to commit the HLE execution when all elided XACQUIRE and XRELEASE pairs have been matched, the nesting count goes to zero, and the locks have satisfied requirements. If execution cannot commit atomically, then execution transitions to a non-transactional execution without elision as if the first instruction did not have an XACQUIRE prefix.

RTM Nesting

Programmers can nest RTM regions up to an implementation specific MAX_RTM_NEST_COUNT. The logical processor tracks the nesting count internally but this count is not available to software. An XBEGIN instruction increments the nesting count, and an XEND instruction decrements the nesting count. The logical processor attempts to commit only if the nesting count becomes zero. A transactional abort occurs if the nesting count exceeds MAX_RTM_NEST_COUNT.

Nesting HLE and RTM

HLE and RTM provide two alternative software interfaces to a common transactional execution capability. Transactional processing behavior is implementation specific when HLE and RTM are nested together, e.g., HLE is inside RTM or RTM is inside HLE. However, in all cases, the implementation will maintain HLE and RTM semantics. An implementation may choose to ignore HLE hints when used inside RTM regions, and may cause a transactional abort when RTM instructions are used inside HLE regions. In the latter case, the transition from transactional to non-transactional execution occurs seamlessly since the processor will re-execute the HLE region without actually doing elision, and then execute the RTM instructions.

Abort Status Definition

RTM uses the EAX register to communicate abort status to software. Following an RTM abort the EAX register has the following definition.

TABLE 1

RTM Abort Status Definition

| EAX Register Bit Position | Meaning |
| --- | --- |
| 0 | Set if abort caused by XABORT instruction |
| 1 | If set, the transaction may succeed on retry, this bit is always clear if bit 0 is set |

TABLE 1-continued

RTM Abort Status Definition

| EAX Register Bit Position | Meaning |
|---|---|
| 2 | Set if another logical processor conflicted with a memory address that was part of the transaction that aborted |
| 3 | Set if an internal buffer overflowed |
| 4 | Set if a debug breakpoint was hit |
| 5 | Set if an abort occurred during execution of a nested transaction |
| 23:6 | Reserved |
| 31-24 | XABORT argument (only valid if bit 0 set, otherwise reserved) |

The EAX abort status for RTM only provides causes for aborts. It does not by itself encode whether an abort or commit occurred for the RTM region. The value of EAX can be 0 following an RTM abort. For example, a CPUID instruction when used inside an RTM region causes a transactional abort and may not satisfy the requirements for setting any of the EAX bits. This may result in an EAX value of 0.

RTM Memory Ordering

A successful RTM commit causes all memory operations in the RTM region to appear to execute atomically. A successfully committed RTM region consisting of an XBEGIN followed by an XEND, even with no memory operations in the RTM region, has the same ordering semantics as a LOCK prefixed instruction.

The XBEGIN instruction does not have fencing semantics. However, if an RTM execution aborts, then all memory updates from within the RTM region are discarded and are not made visible to any other logical processor.

RTM-Enabled Debugger Support

By default, any debug exception inside an RTM region will cause a transactional abort and will redirect control flow to the fallback instruction address with architectural state recovered and bit 4 in EAX set. However, to allow software debuggers to intercept execution on debug exceptions, the RTM architecture provides additional capability.

If bit 11 of DR7 and bit 15 of the IA32_DEBUGCTL_MSR are both 1, any RTM abort due to a debug exception (#DB) or breakpoint exception (#BP) causes execution to roll back and restart from the XBEGIN instruction instead of the fallback address. In this scenario, the EAX register will also be restored back to the point of the XBEGIN instruction.

Programming Considerations

Typical programmer-identified regions are expected to transactionally execute and commit successfully. However, Intel TSX does not provide any such guarantee. A transactional execution may abort for many reasons. To take full advantage of the transactional capabilities, programmers should follow certain guidelines to increase the probability of their transactional execution committing successfully.

This section discusses various events that may cause transactional aborts. The architecture ensures that updates performed within a transaction that subsequently aborts execution will never become visible. Only committed transactional executions initiate an update to the architectural state. Transactional aborts never cause functional failures and only affect performance.

Instruction Based Considerations

Programmers can use any instruction safely inside a transaction (HLE or RTM) and can use transactions at any privilege level. However, some instructions will always abort the transactional execution and cause execution to seamlessly and safely transition to a non-transactional path.

Intel TSX allows for most common instructions to be used inside transactions without causing aborts. The following operations inside a transaction do not typically cause an abort:

Operations on the instruction pointer register, general purpose registers (GPRs) and the status flags (CF, OF, SF, PF, AF, and ZF); and Operations on XMM and YMM registers and the MXCSR register.

However, programmers must be careful when intermixing SSE and AVX operations inside a transactional region. Intermixing SSE instructions accessing XMM registers and AVX instructions accessing YMM registers may cause transactions to abort. Programmers may use REP/REPNE prefixed string operations inside transactions. However, long strings may cause aborts. Further, the use of CLD and STD instructions may cause aborts if they change the value of the DF flag. However, if DF is 1, the STD instruction will not cause an abort. Similarly, if DF is 0, then the CLD instruction will not cause an abort.

Instructions not enumerated here as causing abort when used inside a transaction will typically not cause a transaction to abort (examples include but are not limited to MFENCE, LFENCE, SFENCE, RDTSC, RDTSCP, etc.).

The following instructions will abort transactional execution on any implementation:

XABORT
CPUID
PAUSE

In addition, in some implementations, the following instructions may always cause transactional aborts. These instructions are not expected to be commonly used inside typical transactional regions. However, programmers must not rely on these instructions to force a transactional abort, since whether they cause transactional aborts is implementation dependent.

Operations on X87 and MMX architecture state. This includes all MMX and X87 instructions, including the FXRSTOR and FXSAVE instructions.

Update to non-status portion of EFLAGS: CLI, STI, POPFD, POPFQ, CLTS.

Instructions that update segment registers, debug registers and/or control registers:

MOV to DS/ES/FS/GS/SS, POP DS/ES/FS/GS/SS, LDS, LES, LFS, LGS, LSS, SWAPGS, WRFSBASE, WRGSBASE, LGDT, SGDT, LIDT, SIDT, LLDT, SLDT, LTR, STR, Far CALL, Far JMP, Far RET, IRET, MOV to DRx, MOV to CR0/CR2/CR3/CR4/CR8 and LMSW.

Ring transitions: SYSENTER, SYSCALL, SYSEXIT, and SYSRET.

TLB and Cacheability control: CLFLUSH, INVD, WBINVD, INVLPG, INVPCID, and memory instructions with a non-temporal hint (MOVNTDQA, MOVNTDQ, MOVNTI, MOVNTPD, MOVNTPS, and MOVNTQ).

Processor state save: XSAVE, XSAVEOPT, and XRSTOR.

Interrupts: INTn, INTO.

IO: IN, INS, REP INS, OUT, OUTS, REP OUTS and their variants.

VMX: VMPTRLD, VMPTRST, VMCLEAR, VMREAD, VMWRITE, VMCALL, VMLAUNCH, VMRESUME, VMXOFF, VMXON, INVEPT, and INVVPID.

SMX: GETSEC.

UD2, RSM, RDMSR, WRMSR, HLT, MONITOR, MWAIT, XSETBV, VZEROUPPER, MASKMOVQ, and V/MASKMOVDQU.

Runtime Considerations

In addition to the instruction-based considerations, runtime events may cause transactional execution to abort. These may be due to data access patterns or micro-architectural implementation features. The following list is not a comprehensive discussion of all abort causes.

Any fault or trap in a transaction that must be exposed to software will be suppressed. Transactional execution will abort and execution will transition to a non-transactional execution, as if the fault or trap had never occurred. If an exception is not masked, then that un-masked exception will result in a transactional abort and the state will appear as if the exception had never occurred.

Synchronous exception events (#DE, #OF, #NP, #SS, #GP, #BR, #UD, #AC, #XF, #PF, #NM, #TS, #MF, #DB, #BP/INT3) that occur during transactional execution may cause an execution not to commit transactionally, and require a non-transactional execution. These events are suppressed as if they had never occurred. With HLE, since the non-transactional code path is identical to the transactional code path, these events will typically reappear when the instruction that caused the exception is re-executed non-transactionally, causing the associated synchronous events to be delivered appropriately in the non-transactional execution. Asynchronous events (NMI, SMI, INTR, IPI, PMI, etc.) occurring during transactional execution may cause the transactional execution to abort and transition to a non-transactional execution. The asynchronous events will be pended and handled after the transactional abort is processed.

Transactions only support write-back cacheable memory type operations. A transaction may always abort if the transaction includes operations on any other memory type. This includes instruction fetches to UC memory type.

Memory accesses within a transactional region may require the processor to set the Accessed and Dirty flags of the referenced page table entry. The behavior of how the processor handles this is implementation specific. Some implementations may allow the updates to these flags to become externally visible even if the transactional region subsequently aborts. Some Intel TSX implementations may choose to abort the transactional execution if these flags need to be updated. Further, a processor's page-table walk may generate accesses to its own transactionally written but uncommitted state. Some Intel TSX implementations may choose to abort the execution of a transactional region in such situations. Regardless, the architecture ensures that, if the transactional region aborts, then the transactionally written state will not be made architecturally visible through the behavior of structures such as TLBs.

Executing self-modifying code transactionally may also cause transactional aborts. Programmers must continue to follow the Intel recommended guidelines for writing self-modifying and cross-modifying code even when employing HLE and RTM. While an implementation of RTM and HLE will typically provide sufficient resources for executing common transactional regions, implementation constraints and excessive sizes for transactional regions may cause a transactional execution to abort and transition to a non-transactional execution. The architecture provides no guarantee of the amount of resources available to do transactional execution and does not guarantee that a transactional execution will ever succeed.

Conflicting requests to a cache line accessed within a transactional region may prevent the transaction from executing successfully. For example, if logical processor P0 reads line A in a transactional region and another logical processor P1 writes line A (either inside or outside a transactional region) then logical processor P0 may abort if logical processor P1's write interferes with processor P0's ability to execute transactionally.

Similarly, if P0 writes line A in a transactional region and P1 reads or writes line A (either inside or outside a transactional region), then P0 may abort if P1's access to line A interferes with P0's ability to execute transactionally. In addition, other coherence traffic may at times appear as conflicting requests and may cause aborts. While these false conflicts may happen, they are expected to be uncommon. The conflict resolution policy to determine whether P0 or P1 aborts in the above scenarios is implementation specific.

Generic Transaction Execution Embodiments:

According to "ARCHITECTURES FOR TRANSACTIONAL MEMORY", a dissertation submitted to the Department of Computer Science and the Committee on Graduate Studies of Stanford University in partial fulfillment of the requirements for the Degree of Doctor of Philosophy, by Austen McDonald, June 2009, incorporated by reference herein in its entirety, fundamentally, there are three mechanisms needed to implement an atomic and isolated transactional region: versioning, conflict detection, and contention management.

To make a transactional code region appear atomic, all the modifications performed by that transactional code region must be stored and kept isolated from other transactions until commit time. The system does this by implementing a versioning policy. Two versioning paradigms exist: eager and lazy. An eager versioning system stores newly generated transactional values in place and stores previous memory values on the side, in what is called an undo-log. A lazy versioning system stores new values temporarily in what is called a write buffer, copying them to memory only on commit. In either system, the cache is used to optimize storage of new versions.

To ensure that transactions appear to be performed atomically, conflicts must be detected and resolved. The two systems, i.e., the eager and lazy versioning systems, detect conflicts by implementing a conflict detection policy, either optimistic or pessimistic. An optimistic system executes transactions in parallel, checking for conflicts only when a transaction commits. A pessimistic system checks for conflicts at each load and store. Similar to versioning, conflict detection also uses the cache, marking each line as either part of the read-set, part of the write-set, or both. The two systems resolve conflicts by implementing a contention management policy. Many contention management policies exist, some are more appropriate for optimistic conflict detection and some are more appropriate for pessimistic. Described below are some example policies.

Since each transactional memory (TM) system needs both versioning detection and conflict detection, these options give rise to four distinct TM designs: Eager-Pessimistic (EP), Eager-Optimistic (EO), Lazy-Pessimistic (LP), and Lazy-Optimistic (LO). Table 2 briefly describes all four distinct TM designs.

Figure 2:
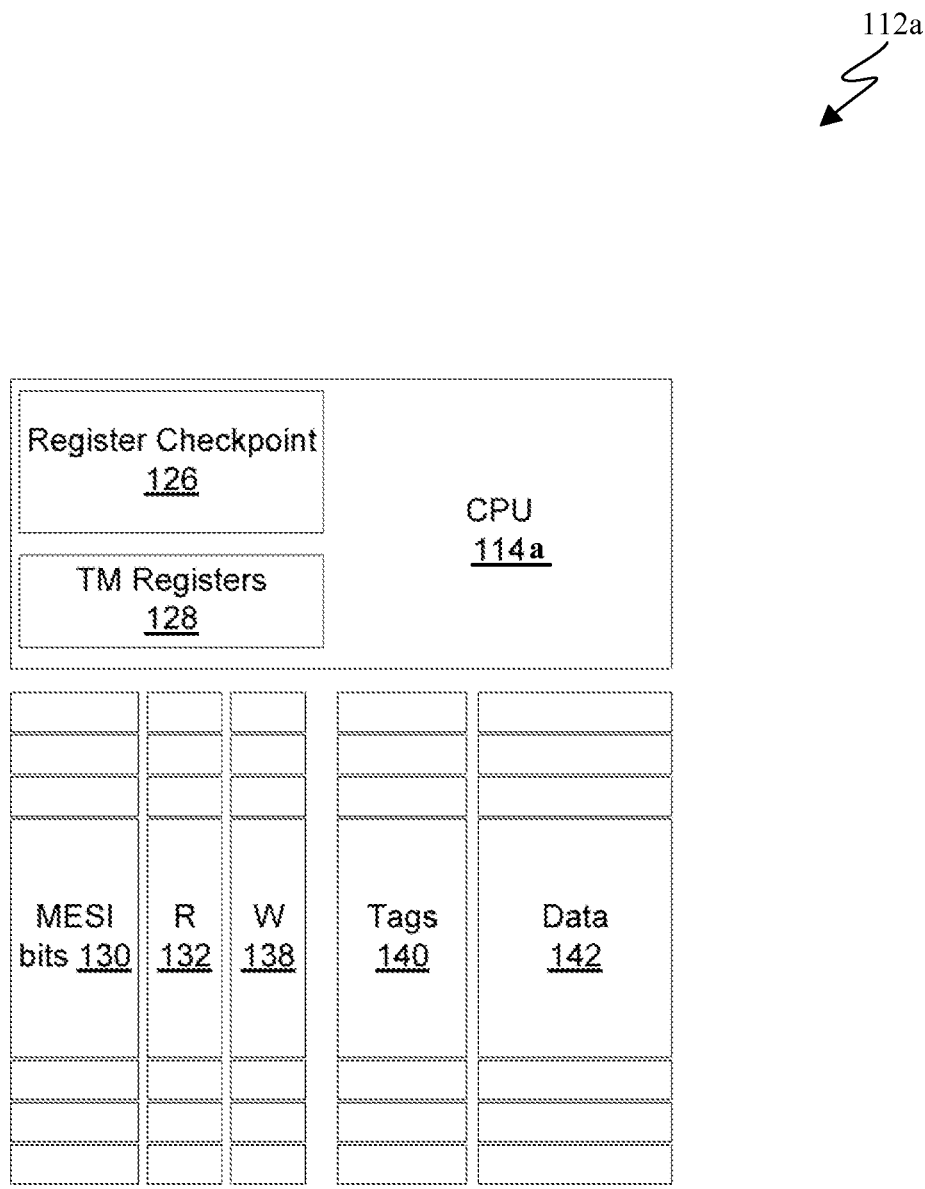
FIG. 2 depicts an example multicore transactional memory environment, in accordance with an illustrative embodiment.

FIGS. 1 and 2 depict an example of a multicore TM environment. FIG. 1 shows many TM-enabled CPUs (CPU1 114a, CPU2 114b, and other CPUs not shown) on one die 100, connected with an interconnect 122, under management of an interconnect control 120a, 120b. Each CPU 114a and 114b (also known as a Processor) may have a split cache consisting of Instruction Cache 116a and 166b for caching instructions from memory to be executed and Data Cache 118a and 118b with TM support for caching data (operands) of memory locations to be operated on by CPU 114a and 114b (in FIG. 1, each CPU 114a, 114b and its associated caches are referenced as 112a and 112b). In an implementation, caches of multiple dies 100 are interconnected to support cache coherency between the caches of multiple dies 100. In an implementation, a single cache, rather than the split cache is employed holding both instructions and data. In implementations, the CPU caches are one level of caching in a hierarchical cache structure. For example each die 100 may employ shared cache 124 to be shared amongst all the CPUs on die 100. In another implementation, each die may have access to shared cache 124, shared amongst all the processors of all dies 100.

FIG. 2 shows the details of transactional CPU environment 112a, having CPU 114a, including additions to support TM. Transactional CPU (processor) 114a may include hardware for supporting Register Checkpoints 126 and special TM Registers 128. The transactional CPU cache may have MESI bits 130, Tags 140 and Data 142 of a conventional cache but also, for example, R bits 132 showing a line has been read by CPU 114a while executing a transaction and W bits 138 showing a line has been written-to by CPU 114a while executing a transaction.

A key detail for programmers in any TM system is how non-transactional accesses interact with transactions. By design, transactional accesses are screened from each other using the mechanisms above. However, the interaction between a regular, non-transactional load with a transaction containing a new value for that address must still be considered. In addition, the interaction between a non-transactional store with a transaction that has read that address must also be explored. These are issues of the database concept isolation.

A TM system is said to implement strong isolation, sometimes called strong atomicity, when every non-transactional load and store acts like an atomic transaction. Therefore, non-transactional loads cannot see uncommitted data and non-transactional stores cause atomicity violations in any transactions that have read that address. A system where this is not the case is said to implement weak isolation, sometimes called weak atomicity.

Strong isolation is often more desirable than weak isolation due to the relative ease of conceptualization and implementation of strong isolation. Additionally, if a programmer has forgotten to surround some shared memory references with transactions, causing bugs, then with strong isolation, the programmer will often detect that oversight using a simple debug interface because the programmer will see a non-transactional region causing atomicity violations. Also, programs written in one model may work differently on another model. Further, strong isolation is often easier to support in hardware TM than weak isolation. With strong isolation, since the coherence protocol already manages load and store communication between processors, transactions can detect non-transactional loads and stores and act appropriately. To implement strong isolation in software Transactional Memory (TM), non-transactional code must be modified to include read- and write-barriers; potentially crippling performance. Although great effort has been expended to remove many unneeded barriers, such techniques are often complex and performance is typically far lower than that of HTMs.

TABLE 2

Transactional Memory Design Space

| | | VERSIONING | |
| --- | --- | --- | --- |
| | | Lazy | Eager |
| CONFLICT DETECTION | Optimistic | Storing updates in a write buffer; detecting conflicts at commit time. | Not practical: waiting to update memory until commit time but detecting conflicts at access time guarantees wasted work and provides no advantage |
| | Pessimistic | Storing updates in a writebuffer; detecting conflicts at access time. | Updating memory, keeping old values in undo log; detecting conflicts at access time. |

Table 2 illustrates the fundamental design space of transactional memory (versioning and conflict detection).

Eager-Pessimistic (EP)

This first TM design described below is known as Eager-Pessimistic. An EP system stores its write-set "in place" (hence the name "eager") and, to support rollback, stores the old values of overwritten lines in an "undo log". Processors use the W 138 and R 132 cache bits to track read and write-sets and detect conflicts when receiving snooped load requests. Perhaps the most notable examples of EP systems in known literature are LogTM and UTM.

Beginning a transaction in an EP system is much like beginning a transaction in other systems: tm_begin( ) takes a register checkpoint, and initializes any status registers. An EP system also requires initializing the undo log, the details of which are dependent on the log format, but often involve initializing a log base pointer to a region of pre-allocated, thread-private memory, and clearing a log bounds register.

Versioning: In EP, due to the way eager versioning is designed to function, the MESI 130 state transitions (cache line indicators corresponding to Modified, Exclusive, Shared, and Invalid code states) are left mostly unchanged. Outside of a transaction, the MESI 130 state transitions are left completely unchanged. When reading a line inside a transaction, the standard coherence transitions apply (S (Shared)→S, I (Invalid)→S, or I→E (Exclusive)), issuing a load miss as needed, but the R 132 bit is also set. Likewise, writing a line applies the standard transitions (S→M, E→I, I→M), issuing a miss as needed, but also sets the W 138 (Written) bit. The first time a line is written, the old version of the entire line is loaded then written to the undo log to preserve it in case the current transaction aborts. The newly written data is then stored "in-place," over the old data.

Conflict Detection: Pessimistic conflict detection uses coherence messages exchanged on misses, or upgrades, to look for conflicts between transactions. When a read miss occurs within a transaction, other processors receive a load request; but they ignore the request if they do not have the needed line. If the other processors have the needed line non-speculatively or have the line R 132 (Read), they downgrade that line to S, and in certain cases issue a cache-to-cache transfer if they have the line in MESI's 130 M or E state. However, if the cache has the line W 138, then a conflict is detected between the two transactions and additional action(s) must be taken.

Similarly, when a transaction seeks to upgrade a line from shared to modified (on a first write), the transaction issues an exclusive load request, which is also used to detect conflicts. If a receiving cache has the line non-speculatively, then the line is invalidated, and in certain cases a cache-to-cache transfer (M or E states) is issued. But, if the line is R 132 or W 138, a conflict is detected.

Validation: Because conflict detection is performed on every load, a transaction always has exclusive access to its own write-set. Therefore, validation does not require any additional work.

Commit: Since eager versioning stores the new version of data items in place, the commit process simply clears the W 138 and R 132 bits and discards the undo log.

Abort: When a transaction rolls back, the original version of each cache line in the undo log must be restored, a process called "unrolling" or "applying" the log. This is done during tm_discard( ) and must be atomic with regard to other transactions. Specifically, the write-set must still be used to detect conflicts: this transaction has the only correct version of lines in its undo log, and requesting transactions must wait for the correct version to be restored from that log. Such a log can be applied using a hardware state machine or software abort handler.

Eager-Pessimistic has the characteristics of: Commit is simple and since it is in-place, very fast. Similarly, validation is a no-op. Pessimistic conflict detection detects conflicts early, thereby reducing the number of "doomed" transactions. For example, if two transactions are involved in a Write-After-Read dependency, then that dependency is detected immediately in pessimistic conflict detection. However, in optimistic conflict detection such conflicts are not detected until the writer commits.

Eager-Pessimistic also has the characteristics of: As described above, the first time a cache line is written, the old value must be written to the log, incurring extra cache accesses. Aborts are expensive as they require undoing the log. For each cache line in the log, a load must be issued, perhaps going as far as main memory before continuing to the next line. Pessimistic conflict detection also prevents certain serializable schedules from existing.

Additionally, because conflicts are handled as they occur, there is a potential for livelock and careful contention management mechanisms must be employed to guarantee forward progress.

Lazy-Optimistic (LO)

Another popular TM design is Lazy-Optimistic (LO), which stores its write-set in a "write buffer" or "redo log" and detects conflicts at commit time (still using the R 132 and W 138 bits).

Versioning: Just as in the EP system, the MESI protocol of the LO design is enforced outside of the transactions. Once inside a transaction, reading a line incurs the standard MESI transitions but also sets the R 132 bit. Likewise, writing a line sets the W 138 bit of the line, but handling the MESI transitions of the LO design is different from that of the EP design. First, with lazy versioning, the new versions of written data are stored in the cache hierarchy until commit while other transactions have access to old versions available in memory or other caches. To make available the old versions, dirty lines (M lines) must be evicted when first written by a transaction. Second, no upgrade misses are needed because of the optimistic conflict detection feature: if a transaction has a line in the S state, it can simply write to it and upgrade that line to an M state without communicating the changes with other transactions because conflict detection is done at commit time.

Conflict Detection and Validation: To validate a transaction and detect conflicts, LO communicates the addresses of speculatively modified lines to other transactions only when it is preparing to commit. On validation, the processor sends one, potentially large, network packet containing all the addresses in the write-set. Data is not sent, but left in the cache of the committer and marked dirty (M). To build this packet without searching the cache for lines marked W, a simple bit vector is used, called a "store buffer," with one bit per cache line to track these speculatively modified lines. Other transactions use this address packet to detect conflicts: if an address is found in the cache and the R 132 and/or W 138 bits are set, then a conflict is initiated. If the line is found but neither R 132 nor W 138 is set, then the line is simply invalidated, which is similar to processing an exclusive load.

To support transaction atomicity, these address packets must be handled atomically, i.e., no two address packets may exist at once with the same addresses. In an LO system, this can be achieved by simply acquiring a global commit token before sending the address packet. However, a two-phase commit scheme could be employed by first sending out the address packet, collecting responses, enforcing an ordering protocol (perhaps oldest transaction first), and committing once all responses are satisfactory.

Commit: Once validation has occurred, commit needs no special treatment: simply clear W 138 and R 132 bits and the store buffer. The transaction's writes are already marked dirty in the cache and other caches' copies of these lines have been invalidated via the address packet. Other processors can then access the committed data through the regular coherence protocol.

Abort: Rollback is equally easy: because the write-set is contained within the local caches, these lines can be invalidated, then clear W 138 and R 132 bits and the store buffer. The store buffer allows W lines to be found to invalidate without the need to search the cache.

Lazy-Optimistic has the characteristics of: Aborts are very fast, requiring no additional loads or stores and making only local changes. More serializable schedules can exist than found in EP, which allows an LO system to more aggressively speculate that transactions are independent, which can yield higher performance. Finally, the late detection of conflicts can increase the likelihood of forward progress.

Lazy-Optimistic also has the characteristics of: Validation takes global communication time proportional to size of write set. Doomed transactions can waste work since conflicts are detected only at commit time.

Lazy-Pessimistic (LP)

Lazy-Pessimistic (LP) represents a third TM design option, sitting somewhere between EP and LO: storing newly written lines in a write buffer but detecting conflicts on a per access basis.

Versioning: Versioning is similar but not identical to that of LO: reading a line sets its R bit 132, writing a line sets its W bit 138, and a store buffer is used to track W lines in the cache. Also, dirty (M) lines must be evicted when first written by a transaction, just as in LO. However, since conflict detection is pessimistic, load exclusives must be performed when upgrading a transactional line from I, S→M, which is unlike LO.

Conflict Detection: LP's conflict detection operates the same as EP's: using coherence messages to look for conflicts between transactions.

Validation: Like in EP, pessimistic conflict detection ensures that at any point, a running transaction has no conflicts with any other running transaction, so validation is a no-op.

Commit: Commit needs no special treatment: simply clear W 138 and R 132 bits and the store buffer, like in LO.

Abort: Rollback is also like that of LO: simply invalidate the write-set using the store buffer and clear the W and R bits and the store buffer.

Eager-Optimistic (EO)

The LP has the characteristics of: Like LO, aborts are very fast. Like EP, the use of pessimistic conflict detection reduces the number of "doomed" transactions. Like EP, some serializable schedules are not allowed and conflict detection must be performed on each cache miss.

The final combination of versioning and conflict detection is Eager-Optimistic (EO). EO may be a less than optimal choice for HTM systems: since new transactional versions are written in-place, other transactions have no choice but to notice conflicts as they occur (i.e., as cache misses occur). But since EO waits until commit time to detect conflicts, those transactions become "zombies," continuing to execute, wasting resources, yet are "doomed" to abort.

EO has proven to be useful in STMs and is implemented by Bartok-STM and McRT. A lazy versioning STM needs to check its write buffer on each read to ensure that it is reading the most recent value. Since the write buffer is not a hardware structure, this is expensive, hence the preference for write-in-place eager versioning. Additionally, since checking for conflicts is also expensive in an STM, optimistic conflict detection offers the advantage of performing this operation in bulk.

Contention Management

How a transaction rolls back once the system has decided to abort that transaction has been described above, but, since a conflict involves two transactions, the topics of which transaction should abort, how that abort should be initiated, and when should the aborted transaction be retried need to be explored. These are topics that are addressed by Contention Management (CM), a key component of transactional memory. Described below are policies regarding how the systems initiate aborts and the various established methods of managing which transactions should abort in a conflict.

Contention Management Policies

A Contention Management (CM) Policy is a mechanism that determines which transaction involved in a conflict should abort and when the aborted transaction should be retried. For example, it is often the case that retrying an aborted transaction immediately does not lead to the best performance. Conversely, employing a back-off mechanism, which delays the retrying of an aborted transaction, can yield better performance. STMs first grappled with finding the best contention management policies and many of the policies outlined below were originally developed for STMs.

CM Policies draw on a number of measures to make decisions, including ages of the transactions, size of read- and write-sets, the number of previous aborts, etc. The combinations of measures to make such decisions are endless, but certain combinations are described below, roughly in order of increasing complexity.

To establish some nomenclature, first note that in a conflict there are two sides: the attacker and the defender. The attacker is the transaction requesting access to a shared memory location. In pessimistic conflict detection, the attacker is the transaction issuing the load or load exclusive. In optimistic, the attacker is the transaction attempting to validate. The defender in both cases is the transaction receiving the attacker's request.

An Aggressive CM Policy immediately and always retries either the attacker or the defender. In LO, Aggressive means that the attacker always wins, and so Aggressive is sometimes called committer wins. Such a policy was used for the earliest LO systems. In the case of EP, Aggressive can be either defender wins or attacker wins.

Restarting a conflicting transaction that will immediately experience another conflict is bound to waste work—namely interconnect bandwidth refilling cache misses. A Polite CM Policy employs exponential back-off (but linear could also be used) before restarting conflicts. To prevent starvation, a situation where a process does not have resources allocated to it by the scheduler, the exponential back-off greatly increases the odds of transaction success after some n retries.

Another approach to conflict resolution is to randomly abort the attacker or defender (a policy called Randomized). Such a policy may be combined with a randomized back-off scheme to avoid unneeded contention.

However, making random choices, when selecting a transaction to abort, can result in aborting transactions that have completed "a lot of work", which can waste resources. To avoid such waste, the amount of work completed on the transaction can be taken into account when determining which transaction to abort. One measure of work could be a transaction's age. Other methods include Oldest, Bulk TM, Size Matters, Karma, and Polka. Oldest is a simple timestamp method that aborts the younger transaction in a conflict. Bulk TM uses this scheme. Size Matters is like Oldest but instead of transaction age, the number of read/written words is used as the priority, reverting to Oldest after a fixed number of aborts. Karma is similar, using the size of the write-set as priority. Rollback then proceeds after backing off a fixed amount of time. Aborted transactions keep their priorities after being aborted (hence the name Karma). Polka works like Karma but instead of backing off a predefined amount of time, it backs off exponentially more each time.

Since aborting wastes work, it is logical to argue that stalling an attacker until the defender has finished their transaction would lead to better performance. Unfortunately, such a simple scheme easily leads to deadlock.

Deadlock avoidance techniques can be used to solve this problem. Greedy uses two rules to avoid deadlock. The first rule is, if a first transaction, T1, has lower priority than a second transaction, T0, or if T1 is waiting for another transaction, then T1 aborts when conflicting with T0. The second rule is, if T1 has higher priority than T0 and is not waiting, then T0 waits until T1 commits, aborts, or starts waiting (in which case the first rule is applied). Greedy provides some guarantees about time bounds for executing a set of transactions. One EP design (LogTM) uses a CM policy similar to Greedy to achieve stalling with conservative deadlock avoidance.

Example MESI coherency rules provide for four possible states in which a cache line of a multiprocessor cache system may reside, M, E, S, and I, defined as follows:

Modified (M): The cache line is present only in the current cache, and is dirty; it has been modified from the value in main memory. The cache is required to write the data back to main memory at some time in the future, before permitting any other read of the (no longer valid) main memory state. The write-back changes the line to the Exclusive state.

Exclusive (E): The cache line is present only in the current cache, but is clean; it matches main memory. It may be changed to the Shared state at any time, in response to a read request. Alternatively, it may be changed to the Modified state when writing to it.

Shared (S): Indicates that this cache line may be stored in other caches of the machine and is "clean"; it matches the main memory. The line may be discarded (changed to the Invalid state) at any time.

Invalid (I): Indicates that this cache line is invalid (unused).

TM coherency status indicators (R 132, W 138) may be provided for each cache line, in addition to, or encoded in the MESI coherency bits. An R 132 indicator indicates the current transaction has read from the data of the cache line, and a W 138 indicator indicates the current transaction has written to the data of the cache line.

In another aspect of TM design, a system is designed using transactional store buffers. U.S. Pat. No. 6,349,361 titled "Methods and Apparatus for Reordering and Renaming Memory References in a Multiprocessor Computer System," filed Mar. 31, 2000 and incorporated by reference herein in its entirety, teaches a method for reordering and renaming memory references in a multiprocessor computer system having at least a first and a second processor. The first processor has a first private cache and a first buffer, and the second processor has a second private cache and a second buffer. The method includes the steps of, for each of a plurality of gated store requests received by the first processor to store a datum, exclusively acquiring a cache line that contains the datum by the first private cache, and storing the datum in the first buffer. Upon the first buffer receiving a load request from the first processor to load a particular datum, the particular datum is provided to the first processor from among the data stored in the first buffer based on an in-order sequence of load and store operations. Upon the first cache receiving a load request from the second cache for a given datum, an error condition is indicated and a current state of at least one of the processors is reset to an earlier state when the load request for the given datum corresponds to the data stored in the first buffer.

The main implementation components of one such transactional memory facility are a transaction-backup register file for holding pre-transaction GR (general register) content, a cache directory to track the cache lines accessed during the transaction, a store cache to buffer stores until the transaction ends, and firmware routines to perform various complex functions. In this section a detailed implementation is described.

IBM zEnterprise EC12 Enterprise Server Embodiment

The IBM zEnterprise EC12 enterprise server introduces transactional execution (TX) in transactional memory, and is described in part in a paper, "Transactional Memory Architecture and Implementation for IBM System z" of Proceedings Pages 25-36 presented at MICRO-45, 1-5 Dec. 2012, Vancouver, British Columbia, Canada, available from IEEE Computer Society Conference Publishing Services (CPS), which is incorporated by reference herein in its entirety. "IBM," "zEnterprise," "System z," "EC12," and/or "MICRO-45" may be subject to trademark rights in various jurisdictions throughout the world and are used here only in reference to the products or services properly denominated by the marks to the extent that such trademark rights may exist.).

Table 3 shows an example transaction. Transactions started with TBEGIN are not assured to ever successfully complete with TEND, since they can experience an aborting condition at every attempted execution, e.g., due to repeating conflicts with other CPUs. This requires that the program support a fallback path to perform the same operation non-transactionally, e.g., by using traditional locking schemes. This puts significant burden on the programming and software verification teams, especially where the fallback path is not automatically generated by a reliable compiler.

TABLE 3

Example Transaction Code

| | | | |
|---|---|---|---|
| loop | LHI | R0,0 | *initialize retry count = 0 |
| | TBEGIN | | *begin transaction |
| | JNZ | abort | *go to abort code if CC1 = 0 |
| | LT | R1, lock | *load and test the fallback lock |
| | JNZ | lckbzy | *branch if lock busy |
| | ... perform operation ... | | |
| | TEND | | *end transaction |
| ... | ... | ... | ... |
| lckbzy | TABORT | | *abort if lock busy; this |
| | | | *resumes after TBEGIN |
| abort | JO | fallback | *no retry if CC = 3 |
| | AHI | R0, 1 | *increment retry count |
| | CIJNL | R0,6, fallback | *give up after 6 attempts |
| | PPA | R0, TX | *random delay based on retry count |
| | ... potentially wait for lock to become free ... | | |
| | J | loop | *jump back to retry fallback |
| | OBTAIN | lock | *using Compare&Swap |
| | ... perform operation ... | | |
| | RELEASE | lock | |
| ... | ... | ... | ... |

The requirement of providing a fallback path for aborted Transaction Execution (TX) transactions can be onerous. Many transactions operating on shared data structures are expected to be short, touch only a few distinct memory locations, and use simple instructions only. For those transactions, the IBM zEnterprise EC12 introduces the concept of constrained transactions; under normal conditions, the CPU 114*a* (FIG. 2) assures that constrained transactions eventually end successfully, albeit without giving a strict limit on the number of necessary retries. A constrained transaction starts with a TBEGINC instruction and ends with a regular TEND. Implementing a task as a constrained or non-constrained transaction typically results in very comparable performance, but constrained transactions simplify software development by removing the need for a fallback path. IBM's Transactional Execution architecture is further described in z/Architecture, Principles of Operation, Tenth Edition, SA22-7832-09 published September 2012 from IBM, incorporated by reference herein in its entirety.

A constrained transaction starts with the TBEGINC instruction. A transaction initiated with TBEGINC must follow a list of programming constraints; otherwise the program takes a non-filterable constraint-violation interruption. Exemplary constraints may include, but not be limited to: the transaction can execute a maximum of 32 instructions, all instruction text must be within 256 consecutive bytes of memory; the transaction contains only forward-pointing relative branches (i.e., no loops or subroutine calls); the transaction can access a maximum of 4 aligned octo-words (an octoword is 32 bytes) of memory; and restriction of the instruction-set to exclude complex instructions like decimal or floating-point operations. The constraints are chosen such that many common operations like doubly linked list-insert/delete operations can be performed, including the very powerful concept of atomic compare-and-swap targeting up to 4 aligned octowords. At the same time, the constraints were chosen conservatively such that future CPU implementations can assure transaction success without needing to adjust the constraints, since that would otherwise lead to software incompatibility.

TBEGINC mostly behaves like XBEGIN in TSX or TBEGIN on IBM's zEC12 servers, except that the floating-point register (FPR) control and the program interruption filtering fields do not exist and the controls are considered to be zero. On a transaction abort, the instruction address is set back directly to the TBEGINC instead of to the instruction after, reflecting the immediate retry and absence of an abort path for constrained transactions.

Nested transactions are not allowed within constrained transactions, but if a TBEGINC occurs within a non-constrained transaction it is treated as opening a new non-constrained nesting level just like TBEGIN would. This can occur, e.g., if a non-constrained transaction calls a subroutine that uses a constrained transaction internally.

Since interruption filtering is implicitly off, all exceptions during a constrained transaction lead to an interruption into the operating system (OS). Eventual successful finishing of the transaction relies on the capability of the OS to page-in the at most 4 pages touched by any constrained transaction. The OS must also ensure time-slices long enough to allow the transaction to complete.

TABLE 4

Transaction Code Example

| | |
|---|---|
| TBEGINC | *begin constrained transaction |
| . . . perform operation. . . | |
| TEND | *end transaction |

Table 4 shows the constrained-transactional implementation of the code in Table 3, assuming that the constrained transactions do not interact with other locking-based code. No lock testing is shown therefore, but could be added if constrained transactions and lock-based code were mixed.

When failure occurs repeatedly, software emulation is performed using millicode as part of system firmware. Advantageously, constrained transactions have desirable properties because of the burden removed from programmers.

Figure 3:
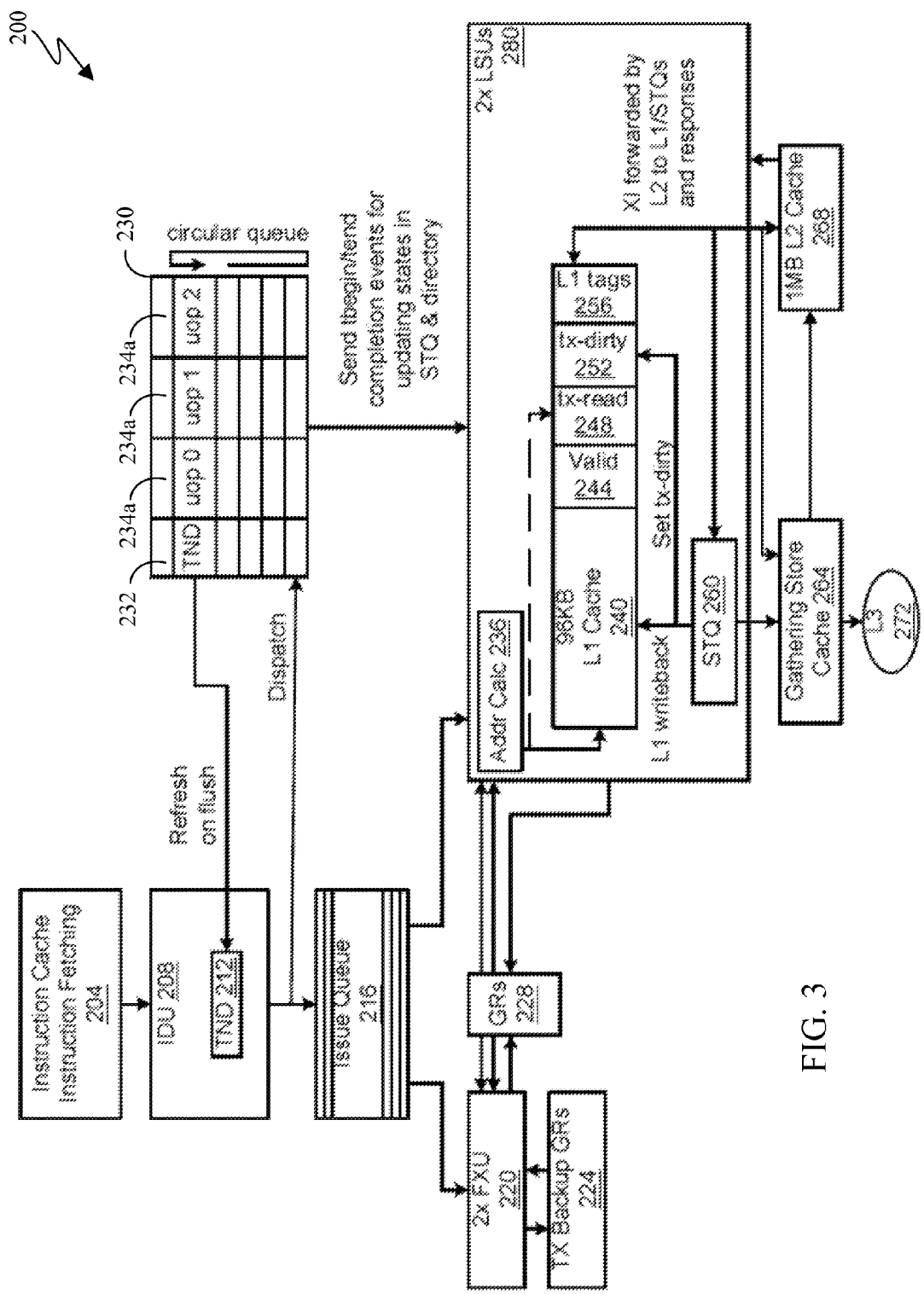
FIG. 3 depicts example components of an example CPU, in accordance with an illustrative embodiment.

With reference to FIG. 3, the IBM zEnterprise EC12 processor introduced transactional execution facility 200. The processor can decode 3 instructions per clock cycle; simple instructions are dispatched as single micro-ops, and more complex instructions are cracked into multiple micro-ops. Micro-ops (Uops 234a, 234b, and 234c) are written into unified issue queue 216, from where they can be issued out-of-order. Up to two fixed-point, one floating-point, two load/store, and two branch instructions can execute every cycle. Global Completion Table (GCT) 230 holds every micro-op 234a, 234b, and 234c and transaction nesting depth (TND) 232. The GCT 230 is written in-order at decode time, tracks the execution status of each micro-op 234a, 234b, and 234c, and completes instructions when all micro-ops 234a, 234b, and 234c of the oldest instruction group have successfully executed.

Level 1 (L1) data cache 240 is a 96 KB (kilo-byte) 6-way associative cache with 256 byte cache-lines and 4 cycle use latency, coupled to a private 1 MB (mega-byte) 8-way associative 2nd-level (L2) data cache 268 with 7 cycles use-latency penalty for L1 240 misses. The L1 240 cache is the cache closest to a processor and Ln cache is a cache at the nth level of caching. Both L1 240 and L2 268 caches are store-through. Six cores on each central processor (CP) chip share a 48 MB 3rd-level store-in cache, and six CP chips are connected to an off-chip 384 MB 4th-level cache, packaged together on a glass ceramic multi-chip module (MCM). Up to 4 multi-chip modules (MCMs) can be connected to a coherent symmetric multi-processor (SMP) system with up to 144 cores (not all cores are available to run customer workload).

Coherency is managed with a variant of the MESI protocol. Cache-lines can be owned read-only (shared) or exclusive; the L1 240 and L2 268 are store-through and thus do not contain dirty lines. The L3 272 and L4 caches (not shown) are store-in and track dirty states. Each cache is inclusive of all its connected lower level caches.

Coherency requests are called "cross interrogates" (XI) and are sent hierarchically from higher level to lower-level caches, and between the L4s. When one core misses the L1 240 and L2 268 and requests the cache line from its local L3 272, the L3 272 checks whether it owns the line, and if necessary sends an XI to the currently owning L2 268/L1 240 under that L3 272 to ensure coherency, before it returns the cache line to the requestor. If the request also misses the L3 272, the L3 272 sends a request to the L4 (not shown), which enforces coherency by sending XIs to all necessary L3s under that L4, and to the neighboring L4s. Then the L4 responds to the requesting L3 which forwards the response to the L2 268/L1 240.

Note that due to the inclusivity rule of the cache hierarchy, sometimes cache lines are XI'ed from lower-level caches due to evictions on higher-level caches caused by associativity overflows from requests to other cache lines. These XIs can be called "LRU XIs", where LRU stands for least recently used.

Making reference to yet another type of XI requests, Demote-XIs transition cache-ownership from exclusive into read-only state, and Exclusive-XIs transition cache ownership from exclusive into invalid state. Demote-XIs and Exclusive-XIs need a response back to the XI sender. The target cache can "accept" the XI, or send a "reject" response if it first needs to evict dirty data before accepting the XI. The L1 240/L2 268 caches are store through, but may reject demote-XIs and exclusive XIs if they have stores in their store queues that need to be sent to L3 before downgrading the exclusive state. A rejected XI will be repeated by the sender. Read-only-XIs are sent to caches that own the line read-only; no response is needed for such XIs since they cannot be rejected. The details of the SMP protocol are similar to those described for the IBM z10 by P. Mak, C. Walters, and G. Strait, in "IBM System z10 processor cache subsystem microarchitecture", IBM Journal of Research and Development, Vol 53:1, 2009, which is incorporated by reference herein in its entirety.

Transactional Instruction Execution

FIG. 3 depicts example components of an example transactional execution environment, including a CPU and caches/components with which it interacts (such as those depicted in FIGS. 1 and 2). The instruction decode unit 208 (IDU) keeps track of the current transaction nesting depth 212 (TND). When the IDU 208 receives a TBEGIN instruction, the nesting depth 212 is incremented, and conversely decremented on TEND instructions. The nesting depth 212 is written into the GCT 230 for every dispatched instruction. When a TBEGIN or TEND is decoded on a speculative path that later gets flushed, the IDU's 208 nesting depth 212 is refreshed from the youngest GCT 230 entry that is not flushed. The transactional state is also written into the issue queue 216 for consumption by the execution units, mostly by the Load/Store Unit (LSU) 280, which also has an effective address calculator 236 is included in the LSU 280. The TBEGIN instruction may specify a transaction diagnostic block (TDB) for recording status information, should the transaction abort before reaching a TEND instruction.

Similar to the nesting depth, the IDU 208/GCT 230 collaboratively track the access register/floating-point register (AR/FPR) modification masks through the transaction nest; the IDU 208 can place an abort request into the GCT 230 when an AR/FPR-modifying instruction is decoded and the modification mask blocks that. When the instruction becomes next-to-complete, completion is blocked and the transaction aborts. Other restricted instructions are handled similarly, including TBEGIN if decoded while in a constrained transaction, or exceeding the maximum nesting depth.

An outermost TBEGIN is cracked into multiple micro-ops depending on the GR-Save-Mask; each micro-op 234a, 234b, and 234c (including, for example uop 0, uop 1, and uop2) will be executed by one of the two fixed point units (FXUs) 220 to save a pair of GRs 228 into a special transaction-backup register file 224, that is used to later restore the GR 228 content in case of a transaction abort. Also the TBEGIN spawns micro-ops 234a, 234b, and 234c to perform an accessibility test for the TDB if one is specified; the address is saved in a special purpose register for later usage in the abort case. At the decoding of an outermost TBEGIN, the instruction address and the instruction text of the TBEGIN are also saved in special purpose registers for a potential abort processing later on.

TEND and NTSTG are single micro-op 234a, 234b, and 234c instructions; NTSTG (non-transactional store) is handled like a normal store except that it is marked as non-transactional in the issue queue 216 so that the LSU 280 can treat it appropriately. TEND is a no-op at execution time, the ending of the transaction is performed when TEND completes.

As mentioned, instructions that are within a transaction are marked as such in the issue queue 216, but otherwise execute mostly unchanged; the LSU 280 performs isolation tracking as described in the next section.

Since decoding is in-order, and since the IDU 208 keeps track of the current transactional state and writes it into the issue queue 216 along with every instruction from the transaction, execution of TBEGIN, TEND, and instructions before, within, and after the transaction can be performed out of order. It is even possible (though unlikely) that TEND is executed first, then the entire transaction, and lastly the TBEGIN executes. Program order is restored through the GCT 230 at completion time. The length of transactions is not limited by the size of the GCT 230, since general purpose registers (GRs) 228 can be restored from the backup register file 224.

During execution, the program event recording (PER) events are filtered based on the Event Suppression Control, and a PER TEND event is detected if enabled. Similarly, while in transactional mode, a pseudo-random generator may be causing the random aborts as enabled by the Transaction Diagnostics Control.

Tracking for Transactional Isolation

The Load/Store Unit 280 tracks cache lines that were accessed during transactional execution, and triggers an abort if an XI from another CPU (or an LRU-XI) conflicts with the footprint. If the conflicting XI is an exclusive or demote XI, the LSU 280 rejects the XI back to the L3 272 in the hope of finishing the transaction before the L3 272 repeats the XI. This "stiff-arming" is very efficient in highly contended transactions. In order to prevent hangs when two CPUs stiff-arm each other, a XI-reject counter is implemented, which triggers a transaction abort when a threshold is met.

The L1 cache directory 240 is traditionally implemented with static random access memories (SRAMs). For the transactional memory implementation, the valid bits 244 (64 rows×6 ways) of the directory have been moved into normal logic latches, and are supplemented with two more bits per cache line: the TX-read 248 and TX-dirty 252 bits.

The TX-read 248 bits are reset when a new outermost TBEGIN is decoded (which is interlocked against a prior still pending transaction). The TX-read 248 bit is set at execution time by every load instruction that is marked "transactional" in the issue queue. Note that this can lead to over-marking if speculative loads are executed, for example on a mispredicted branch path. The alternative of setting the TX-read 248 bit at load completion time was too expensive for silicon area, since multiple loads can complete at the same time, requiring many read-ports on the load-queue.

Stores execute the same way as in non-transactional mode, but a transaction mark is placed in the store queue (STQ) 260 entry of the store instruction. At write-back time, when the data from the STQ 260 is written into the L1 240, the TX-dirty bit 252 in the L1-directory 256 is set for the written cache line. Store write-back into the L1 240 occurs only after the store instruction has completed, and at most one store is written back per cycle. Before completion and write-back, loads can access the data from the STQ 260 by means of store-forwarding; after write-back, the CPU 114a (FIG. 2) can access the speculatively updated data in the L1 240. If the transaction ends successfully, the TX-dirty bits 252 of all cache-lines are cleared, and also the TX-marks of not yet written stores are cleared in the STQ 260, effectively turning the pending stores into normal stores.

On a transaction abort, all pending transactional stores are invalidated from the STQ 260, even those already completed. All cache lines that were modified by the transaction in the L1 240, that is, have the TX-dirty bit 252 on, have their valid bits turned off, effectively removing them from the L1 240 cache instantaneously.

The architecture requires that before completing a new instruction, the isolation of the transaction read- and write-set is maintained. This isolation is ensured by stalling instruction completion at appropriate times when XIs are pending; speculative out-of order execution is allowed, optimistically assuming that the pending XIs are to different addresses and not actually cause a transaction conflict. This design fits very naturally with the XI-vs-completion interlocks that are implemented on prior systems to ensure the strong memory ordering that the architecture requires.

When the L1 240 receives an XI, L1 240 accesses the directory to check validity of the XI'ed address in the L1 240, and if the TX-read bit 248 is active on the XI'ed line and the XI is not rejected, the LSU 280 triggers an abort. When a cache line with active TX-read bit 248 is LRU'ed from the L1 240, a special LRU-extension vector remembers for each of the 64 rows of the L1 240 that a TX-read line existed on that row. Since no precise address tracking exists for the LRU extensions, any non-rejected XI that hits a valid extension row the LSU 280 triggers an abort. Providing the LRU-extension effectively increases the read footprint capability from the L1-size to the L2-size and associativity, provided no conflicts with other CPUs 114a and 114b (FIGS. 1 and 2) against the non-precise LRU-extension tracking causes aborts.

The store footprint is limited by the store cache size (the store cache is discussed in more detail below) and thus implicitly by the L2 268 size and associativity. No LRU-extension action needs to be performed when a TX-dirty 252 cache line is LRU'ed from the L1 240.

Store Cache

In prior systems, since the L1 240 and L2 268 are store-through caches, every store instruction causes an L3 272 store access; with now 6 cores per L3 272 and further improved performance of each core, the store rate for the L3 272 (and to a lesser extent for the L2 268) becomes problematic for certain workloads. In order to avoid store queuing delays, a gathering store cache 264 had to be added, that combines stores to neighboring addresses before sending them to the L3 272.

For transactional memory performance, it is acceptable to invalidate every TX-dirty 252 cache line from the L1 240 on transaction aborts, because the L2 268 cache is very close (7 cycles L1 240 miss penalty) to bring back the clean lines. However, it would be unacceptable for performance (and silicon area for tracking) to have transactional stores write the L2 268 before the transaction ends and then invalidate all dirty L2 268 cache lines on abort (or even worse on the shared L3 272).

The two problems of store bandwidth and transactional memory store handling can both be addressed with the gathering store cache 264. The cache 264 is a circular queue of 64 entries, each entry holding 128 bytes of data with byte-precise valid bits. In non-transactional operation, when a store is received from the LSU 280, the store cache 264 checks whether an entry exists for the same address, and if so gathers the new store into the existing entry. If no entry exists, a new entry is written into the queue, and if the number of free entries falls under a threshold, the oldest entries are written back to the L2 268 and L3 272 caches.

When a new outermost transaction begins, all existing entries in the store cache are marked closed so that no new stores can be gathered into them, and eviction of those entries to L2 268 and L3 272 is started. From that point on, the transactional stores coming out of the LSU 280 STQ 260 allocate new entries, or gather into existing transactional entries. The write-back of those stores into L2 268 and L3 272 is blocked, until the transaction ends successfully; at that point subsequent (post-transaction) stores can continue to gather into existing entries, until the next transaction closes those entries again.

The store cache 264 is queried on every exclusive or demote XI, and causes an XI reject if the XI compares to any active entry. If the core is not completing further instructions while continuously rejecting XIs, the transaction is aborted at a certain threshold to avoid hangs.

The LSU 280 requests a transaction abort when the store cache 264 overflows. The LSU 280 detects this condition when it tries to send a new store that cannot merge into an existing entry, and the entire store cache 264 is filled with stores from the current transaction. The store cache 264 is managed as a subset of the L2 268: while transactionally dirty lines can be evicted from the L1 240, they have to stay resident in the L2 268 throughout the transaction. The maximum store footprint is thus limited to the store cache size of 64×128 bytes, and it is also limited by the associativity of the L2 268. Since the L2 268 is 8-way associative and has 512 rows, it is typically large enough to not cause transaction aborts.

If a transaction aborts, the store cache 264 is notified and all entries holding transactional data are invalidated. The store cache 264 also has a mark per doubleword (8 bytes) whether the entry was written by a NTSTG instruction—those doublewords stay valid across transaction aborts.

Millicode-Implemented Functions

Traditionally, IBM mainframe server processors contain a layer of firmware called millicode which performs complex functions like certain CISC instruction executions, interruption handling, system synchronization, and RAS. Millicode includes machine dependent instructions as well as instructions of the instruction set architecture (ISA) that are fetched and executed from memory similarly to instructions of application programs and the operating system (OS). Firmware resides in a restricted area of main memory that customer programs cannot access. When hardware detects a situation that needs to invoke millicode, the instruction fetching unit 204 switches into "millicode mode" and starts fetching at the appropriate location in the millicode memory area. Millicode may be fetched and executed in the same way as instructions of the instruction set architecture (ISA), and may include ISA instructions.

For transactional memory, millicode is involved in various complex situations. Every transaction abort invokes a dedicated millicode subroutine to perform the necessary abort steps. The transaction-abort millicode starts by reading special-purpose registers (SPRs) holding the hardware internal abort reason, potential exception reasons, and the aborted instruction address, which millicode then uses to store a TDB if one is specified. The TBEGIN instruction text is loaded from an SPR to obtain the GR-save-mask, which is needed for millicode to know which GRs 238 to restore.

The CPU 114a (FIG. 2) supports a special millicode-only instruction to read out the backup-GRs 224 and copy them into the main GRs 228. The TBEGIN instruction address is also loaded from an SPR to set the new instruction address in the PSW to continue execution after the TBEGIN once the millicode abort subroutine finishes. That PSW may later be saved as program-old PSW in case the abort is caused by a non-filtered program interruption.

The TABORT instruction may be millicode implemented; when the IDU 208 decodes TABORT, it instructs the instruction fetch unit to branch into TABORT's millicode, from which millicode branches into the common abort subroutine.

The Extract Transaction Nesting Depth (ETND) instruction may also be millicoded, since it is not performance critical; millicode loads the current nesting depth out of a special hardware register and places it into a GR 228. The PPA instruction is millicoded; it performs the optimal delay based on the current abort count provided by software as an operand to PPA, and also based on other hardware internal state.

For constrained transactions, millicode may keep track of the number of aborts. The counter is reset to 0 on successful TEND completion, or if an interruption into the OS occurs (since it is not known if or when the OS will return to the program). Depending on the current abort count, millicode can invoke certain mechanisms to improve the chance of success for the subsequent transaction retry. The mechanisms involve, for example, successively increasing random delays between retries, and reducing the amount of speculative execution to avoid encountering aborts caused by speculative accesses to data that the transaction is not actually using. As a last resort, millicode can broadcast to other CPUs other than 114a which is processing the local transaction, to stop all conflicting work and retry the local transaction before releasing the other CPUs to continue normal processing. Where multiple CPUs are enabled, their activity must be coordinated to not cause deadlocks, so some serialization between millicode instances on different CPUs 114 is required.

B. Computer Program Product Claim Support

A computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

C. Example Server Computer System

Figure 4:
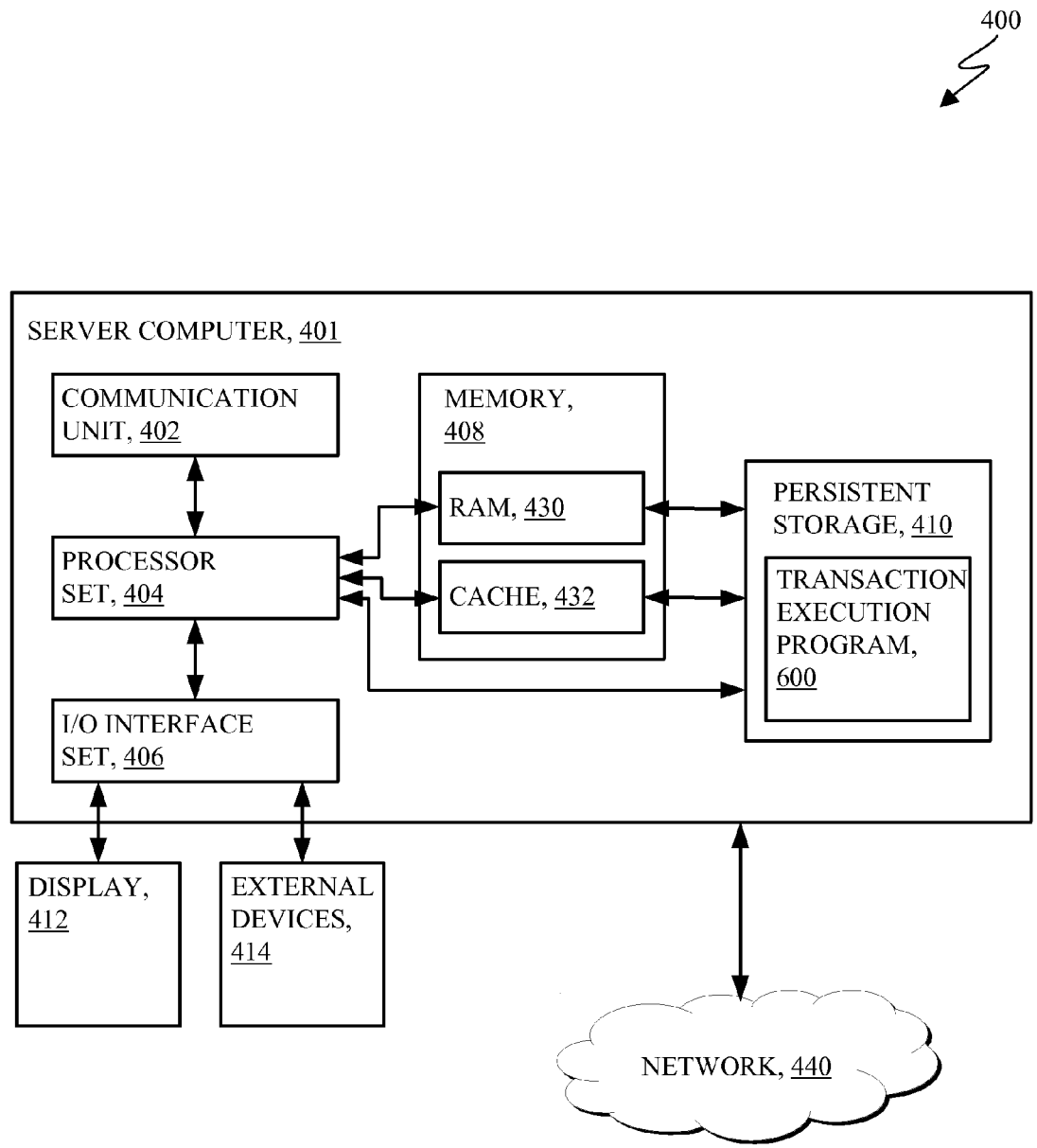
FIG. 4 is a block diagram view of a first embodiment of a system according to the present invention.

An embodiment of a possible hardware and software environment for software and/or methods according to the present invention will now be described in detail with reference to the Figures. FIG. 4 is a functional block diagram illustrating various portions of computing environment 400, including: server computer 401; communication unit 402; processor set 404; input/output (I/O) interface set 406;

memory device 408; persistent storage device 410; display device 412; external device set 414; random access memory (RAM) devices 430; cache memory device 432; communication network 440; and transaction execution program 600.

Computing environment 400 is, in many respects, representative of the various computer subsystem(s) in the present invention. Accordingly, several portions of computing environment 400 will now be discussed in the following paragraphs.

Server computer 401 may be a laptop computer, tablet computer, netbook computer, personal computer (PC), a desktop computer, a personal digital assistant (PDA), a smart phone, or any programmable electronic device capable of communicating with the other devices (not displayed) via network 440. Transaction execution program 600 is a collection of machine readable instructions and/or data that is used to create, manage and control certain software functions that will be discussed in detail, below, in the Example Embodiment subsection of this Detailed Description section.

Server computer 401 is capable of communicating with other computer subsystems via network 440. Network 440 can be, for example, a local area network (LAN), a wide area network (WAN) such as the Internet, or a combination of the two, and can include wired, wireless, or fiber optic connections. In general, network 440 can be any combination of connections and protocols that will support communications between server computer 401 and other computing devices.

Server computer 401 is shown as a block diagram with many double arrows. These double arrows (no separate reference numerals) represent a communications fabric, which provides communications between various components of computer system 400. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 408 and persistent storage 410 are computer-readable storage media. In general, memory 408 can include any suitable volatile or non-volatile computer-readable storage media. It is further noted that, now and/or in the near future: (i) external device(s) 414 may be able to supply, some or all, memory for server computer 401; and/or (ii) devices external to server computer 401 may be able to provide memory for server computer 401.

Transaction execution program 600 is stored in persistent storage 410 for access and/or execution by one or more of the respective computer processors 404, usually through one or more memories of memory 408. Persistent storage 410: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 410.

Transaction execution program 600 may include both machine readable and performable instructions and/or substantive data (that is, the type of data stored in a database). In this particular embodiment, persistent storage 410 includes a magnetic hard disk drive. To name some possible variations, persistent storage 410 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 410 may also be removable. For example, a removable hard drive may be used for persistent storage 410. Other examples include optical and magnetic disks, thumb drives, and smart cards that are inserted into a drive for transfer onto another computer-readable storage medium that is also part of persistent storage 410.

Communications unit 402, in these examples, provides for communications with other data processing systems or devices external to subsystem 402. In these examples, communications unit 402 includes one or more network interface cards. Communications unit 402 may provide communications through the use of either or both physical and wireless communications links. Any software modules discussed herein may be downloaded to a persistent storage device (such as persistent storage device 410) through a communications unit (such as communications unit 402).

I/O interface set 406 allows for input and output of data with other devices that may be connected locally in data communication with server computer 401. For example, I/O interface set 406 provides a connection to external device set 414. External device set 414 will typically include devices such as a keyboard, keypad, a touch screen, and/or some other suitable input device. External device set 414 can also include portable computer-readable storage media such as, for example, thumb drives, portable optical or magnetic disks, and memory cards. Software and data used to practice embodiments of the present invention, for example, transaction execution program 600, can be stored on such portable computer-readable storage media. In these embodiments the relevant software may (or may not) be loaded, in whole or in part, onto persistent storage device 410 via I/O interface set 406. I/O interface set 406 also connects in data communication with display device 412.

Display device 412 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Transaction execution program 600 operates to monitor when a transaction is being processed, and enable detection of an end-transaction instruction during speculative look ahead processing. By detecting an end-transaction instruction during the speculative look ahead operation, a processor can determine whether it is near the end of the instructions that comprise the transaction. If an interference occurs, the processor can make better informed decisions regarding halting, or aborting, a processing transaction, or delaying the interference request.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

II. Example Embodiment

Figure 5:
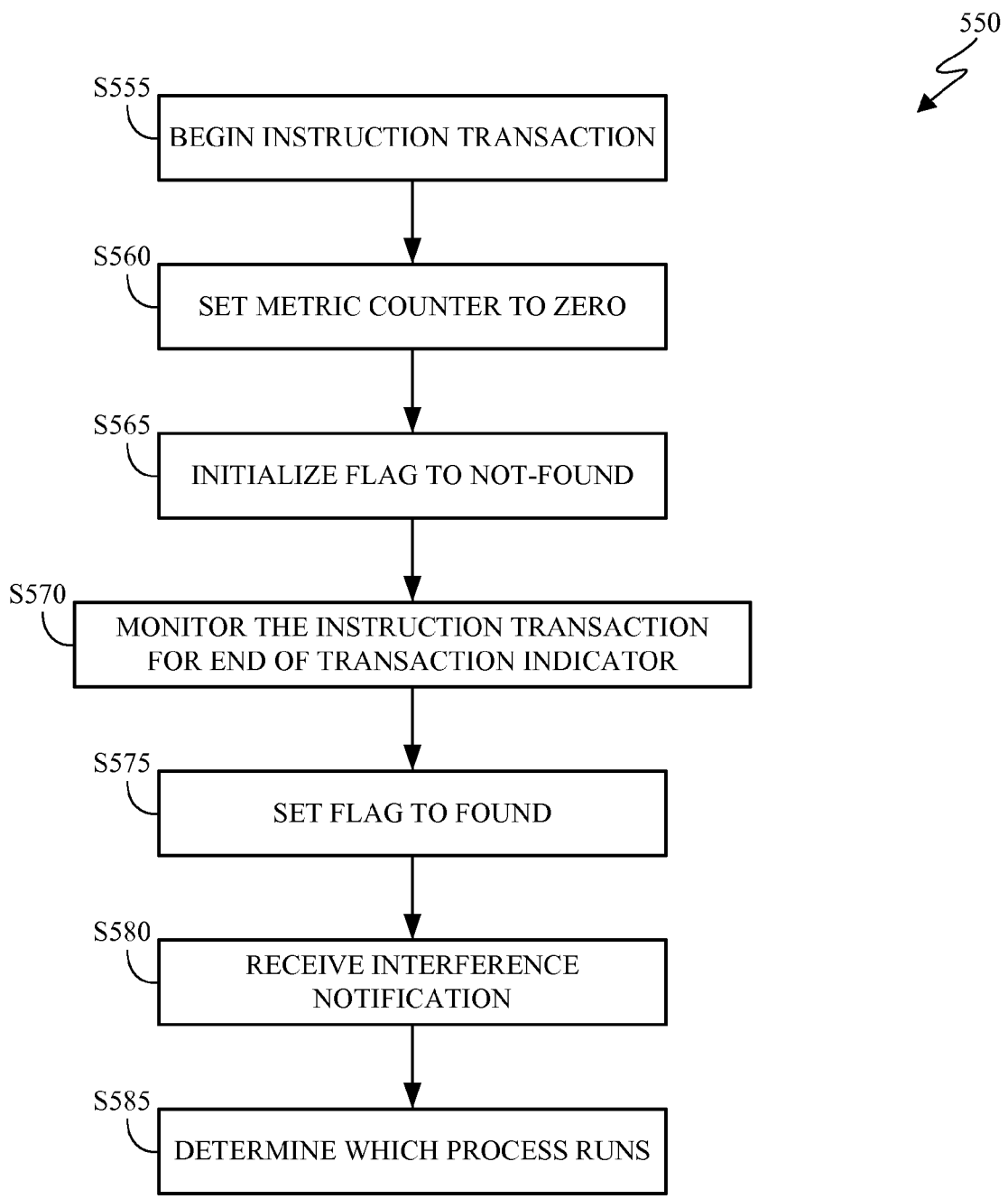
FIG. 5 is a flowchart showing a first embodiment method performed, at least in part, by the first embodiment system.
Figure 6:
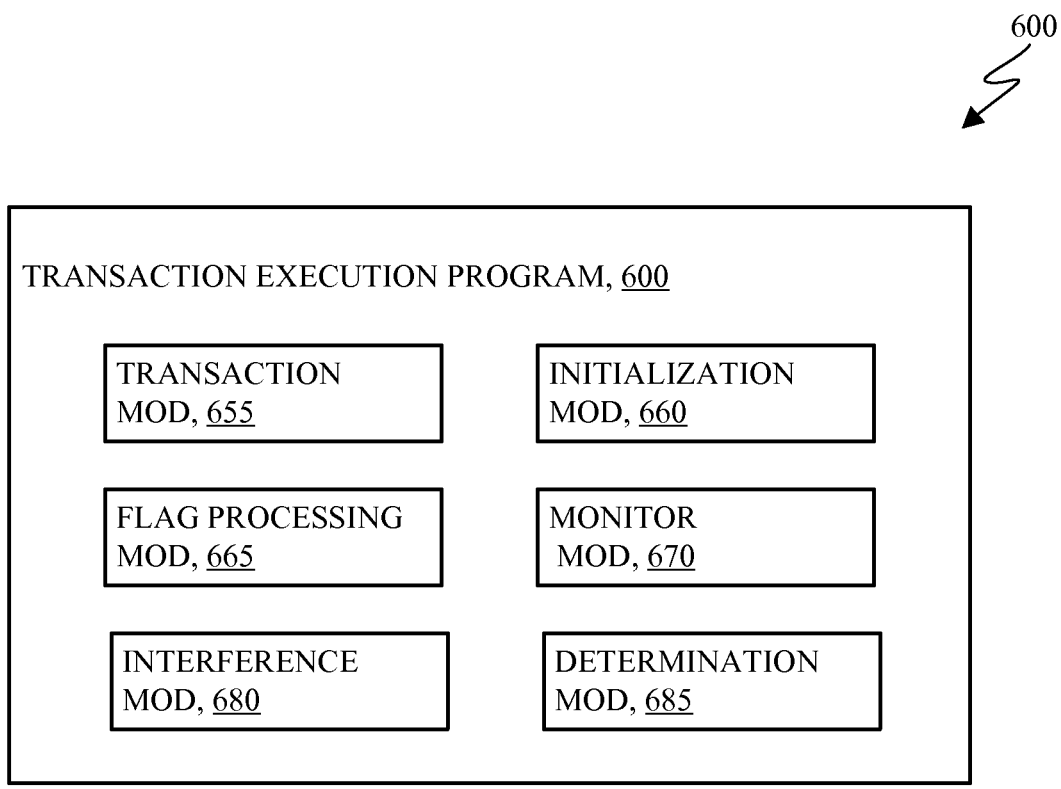
FIG. 6 is a block diagram view of a machine logic (for example, software) portion of the first embodiment system.

FIG. 5 shows flowchart 550 depicting a method according to the present invention. FIG. 6 shows transaction execution program 600 for performing at least some of the method steps of flowchart 550. This method and associated software will now be discussed, over the course of the following paragraphs, with extensive reference to FIG. 5 (for the method step blocks) and FIG. 6 (for the software blocks).

Processing begins at step S555, where transaction module ("mod") 655 receives a begin-transaction instruction (e.g., T_BEGIN, TXBEGIN, or XBEGIN among others) indicating the beginning of a transaction. The transaction comprises the begin-transaction instruction and all the instructions immediately following the begin-transaction program instruction up to, and including an end-transaction instruction (e.g., T_END, TXEND, or XEND among others) that corresponds to the begin-transaction instruction.

Processing proceeds to step S560, where initialization mod 660 carries out initialization operations necessary to enable processing of the transaction to begin. Initialization operations may include, but are not limited to: (i) setting a transaction indicator to indicate a transaction is currently being processed; (ii) setting a metric counter to zero; (iii) preparing for a rollback situation by keeping a backup copy of the processor state at the beginning of transaction processing; and/or (iv) invoking flag processing mod 665 to indicate the end-of-transaction has not been detected.

A transaction indicator may be implemented in software, hardware, or a combination of the two. In some embodiments of the present invention, the transaction indicator is a software implementation using a Boolean flag, wherein a zero value indicates that no transaction is being processed, and a one value indicates that a transaction is being processed. Additionally, in some embodiments of the present invention, the transaction indicator is a hardware implementation and a status register is used to indicate whether or not a transaction is being processed. Further, in some embodiments of the present invention, nested transactions are supported, and the transaction indicator is a counter that is incremented each time a begin-transaction is encountered, and decremented each time an end-transaction is encountered, thus, indicating all nested transactions are complete when the value in the transaction indicator reaches zero.

A metric counter may be used by the instruction processor to determine how far the current instruction is from the end of the transaction (e.g., how many instructions remain in the transaction). When a begin-transaction instruction is encountered, a metric counter corresponding to the current transaction is initialized to zero. In some embodiments of the present invention, the metric counter is incremented once for each instruction identified during a speculative look ahead operation, and the metric counter is frozen when an end-transaction instruction is encountered during the speculative look ahead operation (i.e., the metric counter will contain the total number of instructions included in the transaction corresponding to the metric counter).

In the event that a transaction is unable to successfully complete, the processor must be able to perform a rollback (e.g., restore) of the environment (e.g., transaction memory, registers, variables, and the like) to a state corresponding to the environment at the beginning of the transaction operation. In some embodiments of the present invention, a rollback is necessary when another process causes an interference by attempting to access the transactional memory corresponding to the transaction. If the interference causes the transaction to halt (also referred to herein as an abort of the transaction) without reaching the end-transaction instruction, all processing performed during the transaction is discarded and a rollback operation is performed to restore the environment to the state equivalent to that at the start of the transaction.

When an environment utilizes speculative look ahead (i.e., when the environment fetches and decodes program instructions prior to execution), an indicator (e.g., TXEND_INSIGHT) may be maintained to determine whether an end-of-transaction has been detected during the speculative look ahead operation. When a begin-transaction instruction is processed, the indicator (e.g., TXEND_INSIGHT) may be initialized to indicate that no end-transaction has been detected.

Processing proceeds to step S565, where flag processing mod 665 receives a request to update an indicator (e.g., a flag) to contain a specified value. The received request may identify a flag and the operation that is to be performed on the flag. In some embodiments of the present invention, the flag is TXEND_INSIGHT, and the operation is indicating no end-transaction instruction has been detected. Additionally, in some embodiments of the present invention, additional operations are carried out, such as, when TXEND_INSIGHT is changed to indicate that no end-transaction instruction has been detected, the metric counter is unfrozen to enable the metric counter to be incremented while the speculative look ahead operation proceeds.

Processing proceeds to step S570, where monitor mod 670 monitors the speculative look ahead operation and detect when an end-transaction instruction is encountered. Speculative look ahead is an operation that predicts an execution path that is likely to be followed in the future, however, it is possible that the prediction is incorrect and the predicted execution path is not actually followed. Predicting an execution path that is not actually followed may occur when the speculative look ahead operation encounters a branch instruction in the instruction stream. Since the information that determines the actual behavior of the branch instruction may not yet be available, the speculative look ahead operation may predict the behavior of the branch instruction based on previous behavior (e.g., including but not limited to local and global branch history, branch address history, branch history vectors and/or a return address stack), static branch prediction information encoded in the instruction, branch policies tangibly incorporated into the processor (e.g., backward branches, i.e., branches to lower addresses than the address of a branch instruction may be predicted as "taken"), meta data, or the like.

Instead of waiting for the information that determines the actual behavior of the branch instruction to become available, the speculative look ahead operation proceeds on a predicted execution path. In some embodiments of the present invention, a backup copy of the metric counter is maintained each time a branch instruction is encountered. If it is later determined that an incorrect execution path was predicted for the branch, the metric counter can be restored to the value it was when the branch instruction was being speculatively looked at, and the speculative look ahead operation can resume following a different execution path. In some embodiments of the present invention, instruction decode is also performed speculatively ahead of instruction execution and at least one decoupling queue (e.g., dispatch queue, issue queue, reorder queue, and the like) is available to store speculatively decoded instructions after the instruction decode operation and prior to instruction execution.

If the speculative look ahead operation encounters an end-transaction instruction, monitor mod 670 performs tasks to indicate that an end-transaction has been encountered (i.e., an end-transaction has been detected). Tasks to be performed include, but are not limited to: (i) freezing the metric counter; and/or (ii) notifying flag processing mod 665 that that an indicator (e.g., a flag) such as TXEND_IN-SIGHT is to be set to indicate an end-transaction instruction has been encountered.

If an end-transaction instruction has been identified, and it turns out that the predicted execution path is incorrect, then the effects of detecting the end-transaction instruction must be rolled back to the point at which the incorrect branch prediction was determined. The rollback operation may include restoring the speculative look ahead operation to the point at which the incorrect branch prediction was determined. The tasks included in the rollback operation may include, but are not limited to: (i) unfreezing the metric counter; (ii) restoring (e.g., rolling back) the metric counter to the state (i.e., value) of the metric counter when the speculative look ahead operation was looking at the branch instruction; and/or (iii) notifying flag processing mod 665 that that an indicator (e.g., a flag) such as TXEND_IN-SIGHT is to be set to indicate that no end-transaction instruction has been encountered.

Processing proceeds to step S575, where flag processing mod 665 receives a request to update an indicator (e.g., a flag) to contain a specified value. The received request may identify a flag and an operation that is to be performed on the flag. In some embodiments of the present invention, the flag is TXEND_INSIGHT, and the operation is indicating that an end-transaction instruction has been detected. Additionally, in some embodiments of the present invention, additional operations are carried out, such as, when TXEND_IN-SIGHT is altered to indicate that an end-transaction instruction has been detected, the metric counter is frozen to allow calculations to determine how close the current instruction is to the end-transaction instruction.

Processing proceeds to step S580, where interference mod 680 receives a notification identifying another process that is attempting to access transactional memory corresponding to an active transaction. In accordance with one embodiment of the present invention, interference is detected in conjunction with the tracking of read and write sets of memory that has been the subject of accesses of the present transaction, and further explained with reference to FIGS. 1, 2, and 3 herein. Interference mod 680 may analyze the circumstances corresponding to the interference. The analysis may include, but is not limited to: (i) determining if delaying the requested halt of the transaction is an option (it should be noted that the terms "halt" and "abort" are used interchangeably herein and have the same meaning); (ii) determining if the transaction is near the end (i.e., an end-transaction instruction has been encountered by the speculative look ahead operation); and/or (iii) if both processes are transactions, determining which transaction is closer to completion.

Processing ends with step S585, where determination mod 685 determines an appropriate action to take with regard to the current transaction. Possible actions may include, but are not limited to: (i) delay the halt request, and continue processing the transaction; (ii) halt the transaction and perform a rollback operation; and/or (iii) request that the interfering transaction halt execution.

Delaying the halt request may include the interfering process waiting for the transaction to complete before the interfering process can obtain the requested data. In this example embodiment of the present invention: (i) a transaction is being processed; (ii) an interference occurs; and (iii) the speculative look ahead operation has encountered an end-transaction instruction. Determination mod 685 determines that the transaction will continue to be executed, however, it is later determined that the encountered end-transaction instruction was in an incorrect execution path, and therefore no end-transaction instruction has been encountered, resulting in the transaction being halted.

When a transaction halts, no additional instructions corresponding to the transaction are run, and a rollback operation may be performed so the processing environment appears as if the transaction had never begun processing. In some embodiments of the present invention, whenever a transaction ends (e.g., halts or runs to completion), a transaction indicator is updated to indicate the transaction is no longer being processed, freeing the processor from any limitations in place during transaction processing.

In some embodiments of the current invention, the interfering transaction is of a lower priority, and the interfering transaction halts, allowing the current transaction to continue processing. In some embodiments of the present invention, the interfering transaction is operating with a higher priority, and therefore the current transaction halts. Additionally, in some embodiments of the present invention, no end-transaction instruction has been encountered by the speculative look ahead operation, and therefore the current transaction halts.

As noted above, interference module 680 receives access requests from remote processes and determines interference. When no interference is detected, and a local processor includes the requested data, a response with the requested data is provided. In some embodiments of the present invention, the interference module provides the requested data as well as an indication that a present transaction of the present processor is to be aborted (action (ii), discussed above).

In some embodiments of the present invention, a decision is made as to whether to provide the data immediately (and cause a transaction abort responsive to such determination), or to defer a response (action (i), above). When a response is deferred, at a later time, responsive to completing the present transaction interference mod 680 provides the data corresponding to a deferred response. Further, when the possibility of a deadlock has been detected, and a present transaction is to be aborted, interference module is notified to provide the data in conjunction with the initiation of a transaction abort.

It should be noted as described above that when an abort operation is delayed, or held, both the instruction to abort as well as the data of the interfering transaction are withheld from processing.

III. Further Comments And/Or Embodiments

Some embodiments of the present invention recognize the following facts, potential problems and/or potential areas for improvement with respect to the current state of the art: (i) when deciding to make decisions about interference between at least two transactions, and deciding which instruction to abort, it is desirable to know which instruction will be ending shortly (e.g., whether holding off on responding to a transaction may prevent an interference); (ii) when an interference must cause one transaction to abort, it may be desirable to halt the transaction that is not close to completing (e.g., do not sacrifice a transaction that would only require a few instruction to be successfully completed); and/or (iii) it is desirable to offer a compatible way of indicating the impending end of a transaction that allows computer code and computer architecture to remain backwardly compatible.

Figure 7:
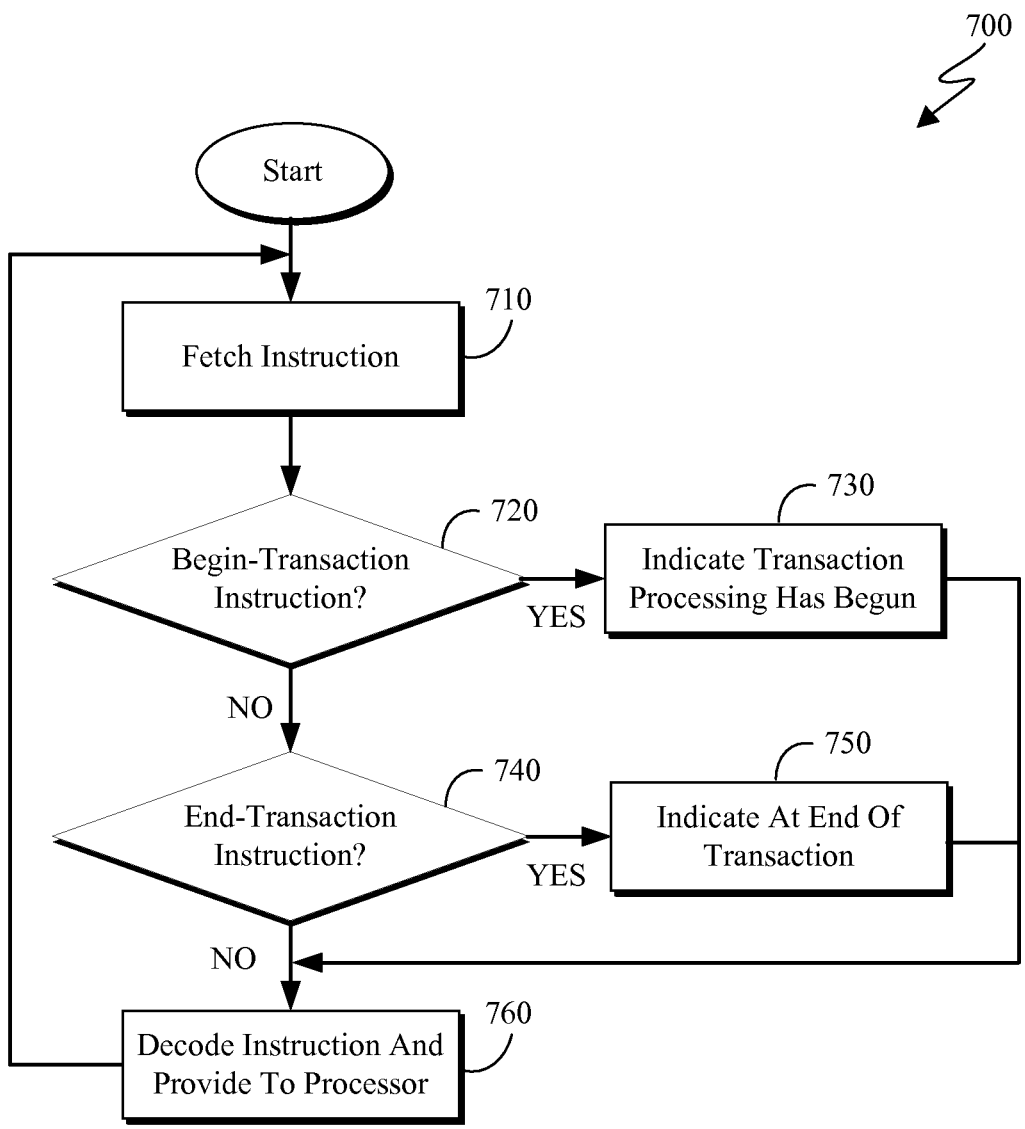
FIG. 7 is a flowchart showing a second embodiment of a method according to the present invention.

FIG. 7 is a flowchart depicting speculative look ahead process 700, in accordance with an embodiment of the present invention. As depicted, speculative look ahead process 700 includes fetching (710) an instruction, determining (720) whether the instruction is a begin-transaction instruction, indicating (730) a begin-transaction has been detected, determining (740) whether the instruction is an end-transaction instruction, indicating (750) an end-transaction has been detected, and decoding (760) the instruction. Speculative look ahead process 700 enables program instructions to be fetched prior to execution time, allowing begin-transaction and end-transaction instructions to be identified prior to instruction execution.

Fetching (710) an instruction may include retrieving an instruction from an instruction cache. The fetching operation may be an initial part of an instruction processing pipeline, where the pipeline may perform activities such as instruction fetch, instruction decode, instruction mapping, instruction queuing, reading a register file, and the like. Numerous instructions may be fetched and queued in preparation to be executed.

Determining (720) whether the instruction is a begin-transaction instruction may include parsing a computer readable instruction, and determining if the instruction is a begin-transaction instruction. In some embodiments of the current invention, the decode phase of instruction processing identifies a begin-transaction instruction. In other embodiments of the current invention, the instruction execution phase of instruction processing identifies a begin-transaction instruction. If the instruction is a begin-transaction instruction, then speculative look ahead process 700 proceeds to indicating (730) a begin-transaction has been detected. Otherwise, speculative look ahead process 700 proceeds to determining (740) whether the instruction is an end-transaction instruction.

Indicating (730) a begin-transaction has been detected may include setting a transaction indicator to indicate a transaction is currently being processed. In some embodiments of the current invention, the transaction indicator is a Boolean indicator implemented as a software solution. In some embodiments of the current invention, the transaction indicator is a Boolean indicator implemented as a hardware solution.

Determining (740) whether the instruction is an end-transaction instruction may include parsing a computer readable instruction, and determining if the instruction is an end-transaction instruction. In some embodiments of the current invention, the decode phase of instruction processing identifies an end-transaction instruction. If the instruction is an end-transaction instruction, then speculative look ahead process 700 proceeds to indicating (750) an end-transaction has been detected. Otherwise, speculative look ahead process 700 proceeds to decoding (760) an end-transaction has been detected.

Indicating (750) an end-transaction has been detected may include setting a transaction indicator to indicate an end-transaction has been detected during the speculative look ahead operation. In some embodiments of the current invention, the transaction indicator is a Boolean indicator implemented as a software solution. In some embodiments of the current invention, the transaction indicator is a Boolean indicator implemented as a hardware solution.

Decoding (760) the instruction may include parsing a computer readable instruction to determine what actions the instruction requires, and the decoding operation may carry out the actions. Instruction decode may be done by the CPU's Control Unit (e.g., IDU 208) and may include: (i) identifying the type of instruction being processed (e.g., an add instruction, a subtract instruction, a store instruction, or the like); (ii) fetching the input operands corresponding to the instruction; and (iii) assisting in predicting the execution path a branch my take.

Figure 8:
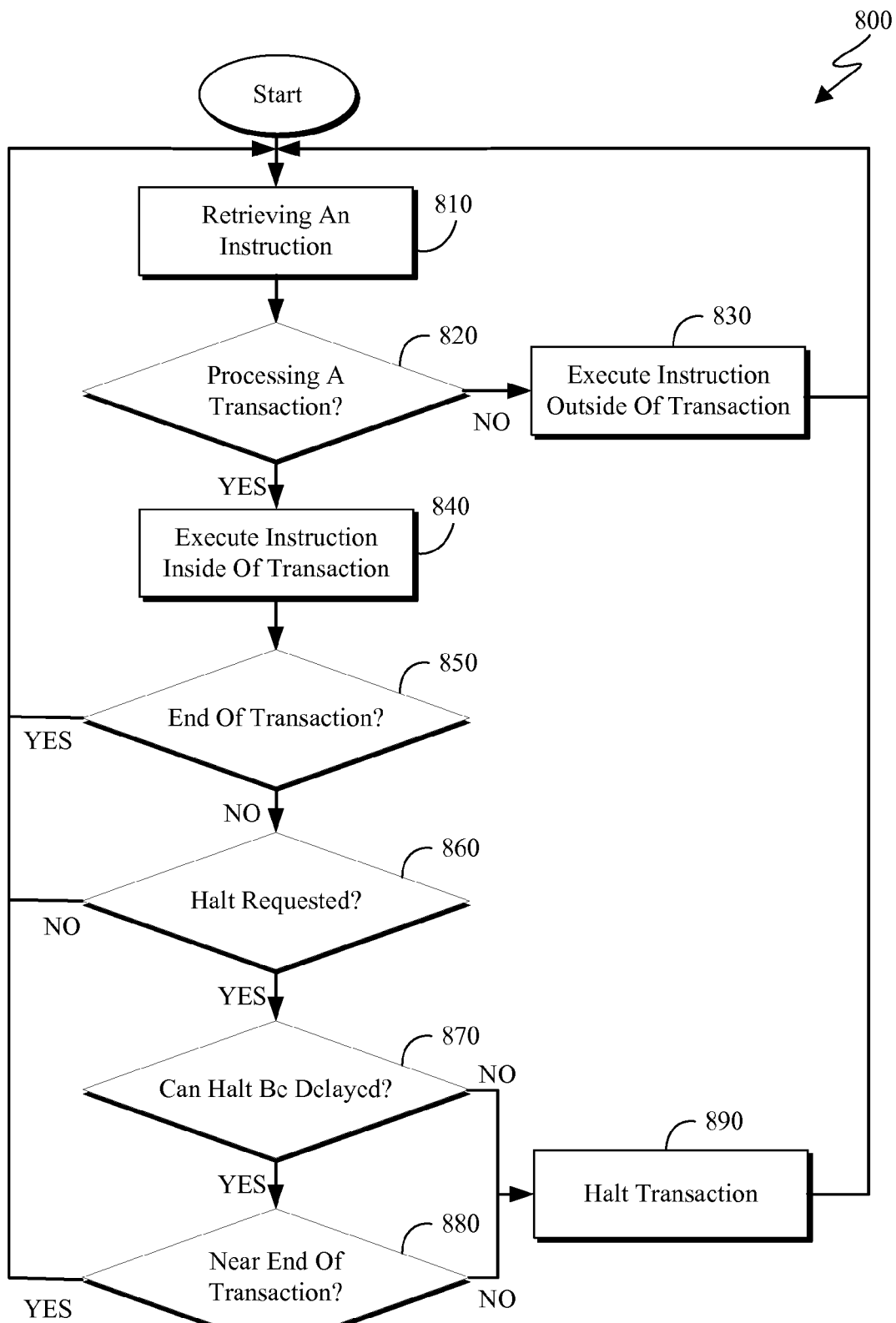
FIG. 8 is a flowchart showing a third embodiment of a method according to the present invention.

FIG. 8 is a flowchart depicting instruction execution operation 800, in accordance with an embodiment of the present invention. As depicted, instruction execution operation 800 includes retrieving (810) an instruction, determining (820) whether a transaction is being processed, executing (830) an instruction outside of a transaction, executing (840) an instruction inside of a transaction, determining (850) whether the transaction has ended, determining (860) whether a halt has been requested by executing, including but not limited to, e.g., a transaction abort T_ABORT instruction, determining (870) whether a halt request can be delayed, determining (880) whether the end of the transaction is near, and halting (890) the transaction. Instruction execution operation 800 depicts an embodiment of the present invention which enables instruction execution of instructions both outside a transaction and/or within a transaction.

Retrieving (810) an instruction may include a processor receiving, from an instruction fetch cache or an instruction decode unit, an instruction to be performed. In some embodiments of the current invention, the retrieved instruction may be the next sequential instruction in an instruction cache. In some other embodiments, the retrieved instruction may be a specific instruction identified by an instruction being decoded (e.g., a branch instruction, an execute instruction, or the like).

Determining (820) whether a transaction is being processed may include checking a transaction indicator to determine if the processor is currently processing instructions within the bounds of a transaction. If the transaction indicator indicates a transaction is being processed, then instruction execution operation 800 proceeds to executing (840) an instruction inside of a transaction. Otherwise, instruction execution operation 800 proceeds to executing (830) an instruction outside of a transaction.

Executing (830) an instruction outside of a transaction may include the computer CPU carrying out operations required to perform the current instruction. The operations may include, but are not limited to: (i) instruction decode; (ii) perform arithmetic logic unit operations (e.g., addition, subtraction, bitwise AND, and the like); (iii) perform memory access operations (e.g., load and/or store operations); and/or (iv) updating a register file with instruction results.

Executing (840) an instructions inside of a transaction may include the computer CPU carrying out operations required to perform the current instruction. For most instructions, there is no difference between an instruction executed inside or outside of a transaction, for example, an add instruction is an add instruction regardless of being executed inside or outside of a transaction. Depending on how rollback is implemented, a snapshot to roll back on a transaction abort can either be made for all or some registers at the beginning of the transaction, for example, in conjunction with tbegin, or for each register as it is written for the first time, etc. For memory access instructions, such as load instructions, store instructions, SS-type (storage/storage) instructions, and/or RX (register+memory) instructions (wherein one operand is a register and one operand is a memory location), executing inside a transaction includes tracking the memory operand as part of the transaction state. Similarly, some instructions are not valid outside a transaction (e.g., t_abort, t_end).

Determining (850) whether the transaction has ended may include checking a transaction indicator to determine if the processor is currently processing instructions within the bounds of a transaction. If the transaction indicator indicates no transaction is being processed, then end of transaction has been processed and instruction execution operation 800 proceeds to retrieving (810) an instruction. Otherwise, instruction execution operation 800 proceeds to determining (860) whether a halt has been requested.

Determining (860) whether a halt has been requested may include detecting that an interference has occurred, wherein an interference may be another process attempting to access data within transactional memory corresponding to a current transaction. If a halt has been requested, then instruction execution operation 800 proceeds to determining (870) whether a halt request can be delayed. Otherwise, instruction execution operation 800 proceeds to halting (890) the transaction.

Determining (870) whether the halt request can be delayed may include determining if the priority of an interfering process is higher than the priority of the currently executing transaction. In some embodiments of the present invention, a halt request cannot be delayed if the interfering process is of higher priority than a currently running transaction. If the halt can be delayed, then instruction execution operation 800 proceeds to determining (880) whether the end of the transaction is near. Otherwise, operation 800 proceeds to halting (890) the transaction.

Determining (880) whether the end of the transaction is near may include checking an indicator (e.g., TXEND_INSIGHT) to determine if an end-transaction instruction has been detected during the speculative look ahead operation. If the TXEND_INSIGHT indicator indicates that the end of the transaction is near, then instruction execution operation 800 proceeds to retrieving (810) an instruction. Otherwise, operation 800 proceeds to halting (890) the transaction.

In accordance with another embodiment of the present transaction, when a determination is made in order to determine at least one of a plurality of transactions is closer to completing a transaction. In accordance with one such embodiment, when a transaction abort cannot be deferred and a transaction must be aborted, the transaction further from the end is aborted. A remote request includes at least one of whether a requester is within a transaction, whether TXEND_INSIGHT for such a transaction, and the number of instructions to the end of the transaction.

When a decision is made to defer the abort of a transaction responsive to detecting an interference, a memory access protocol request form a remote processor is not honored. In at least one embodiment, no response is returned. To avoid a deadlock condition, wherein a requesting transaction and a transaction deferring a response are also deferring a response for another transaction and waiting for a response, respectively, a variety of deadlock detection and resolution methods may be employed in accordance with embodiments of the present invention.

Detecting a deadlock may be undesirable (e.g. too expensive, too time consuming), however, a number of heuristics may be used to determine the possibility of a deadlock being present. Thus, in some embodiments, a known deadlock detection mechanism is executed. When a deadlock is detected, at least one transaction is aborted in order to resolve a deadlock condition. In accordance with at least one embodiment, the present transaction is aborted. In particular, it is sufficient for the present transaction to be aborted to remove the present transaction from any contribution to a deadlock.

In other embodiments, conclusive determination of a deadlock is not desireable (e.g. too expensive). In accordance with at least one such embodiment, a deadlock determination heuristic is used. In contrast to a deterministic deadlock determination algorithm, a deadlock determination heuristic is adapted to determine whether a deadlock might be conceivably present. Such an algorithm must be conservative such that it must indicate for all possible deadlocks the presence of a possible deadlock, but may overindicate, that is, it may indicate the possibility of a deadlock when, in fact, none is present. In the following paragraphs, a variety of deadlock detection methods and heuristics.

In at least one embodiment, when a request is not within a transaction, no deadlock can be present, and deferring a response does not include a risk of deadlock. At least one embodiment employs a time-out wherein a transaction may defer handling and interference and responding to a remote access request for up to a predetermined number of cycles, causing a time-out to resolve a possible deadlock. When a time-out occurs, the present transaction is aborted and rolled back, and the memory request is honored. In another embodiment, a requester is notified that the request will not be honored, and the requestor must abort its own transaction responsive to receiving such response.

In another embodiment, a determination is made that forward progress is maintained, i.e., that instructions continue to complete execution without delay. Thus, in one embodiment, a threshold of a number of cycles without instruction completion is determined to indicate the possibility of a deadlock having occurred. Responsive to this condition, the present transaction is aborted and rolled back, and the memory request is honored. In another embodiment, a requester is notified that the request will not be honored, and the requestor must abort its own transaction responsive to receiving such response.

Halting (890) the transaction may include taking actions to cease processing of instructions included in the current transaction. The actions may include, but are not limited to: (i) updating a transaction indicator to indicate the transaction is no longer being processed, which frees the processor from any limitations in place corresponding to transaction processing; and/or (ii) initiating a rollback operation to restore the environment to the state equivalent to that at the start of the transaction.

In some embodiments of the present invention, for non-nested transactions, a single bit, TXEND_INSIGHT, is maintained. A TBEGIN (i.e., a begin-transaction instruction) sets the bit to zero, and a subsequent TEND (i.e., an end-transaction instruction) sets the bit to 1. When TXEND_INSIGHT is asserted, the system can assume that the transaction will end shortly.

In some embodiments of the present invention, TXEND_INSIGHT is maintained as part of the rollback state to recover from branch mis-predictions. In at least one embodiment, the state to recover from the rollback of a branch is stored in an instruction table or global completion table, such as 230 (FIG. 3).

In some embodiments of the present invention, additional granularity is desirable, and it is desirable for each instruction to know how far away from the end the current instruction is in accordance with at least one (or multiple) metrics. In at least one such embodiment, the distance of the current instruction from the end of the transaction can be determined by subtracting the transaction instruction fetch counter of the current instruction from the transaction instruction fetch counter of the TEND instruction, when the TX_END_INSIGHT indicator is set. The transaction instruction fetch counter corresponds to the counter counting fetched instructions since the beginning of the transaction. In at least one such embodiment, the transaction instruction fetch counter is included in the rollback state stored in conjunction with branch mis-prediction recovery, and restored when a branch mis-prediction is encountered and a branch mis-prediction rollback is performed.

In some embodiments of the present invention, where nested transactions are supported in a flattening mode, each TBEGIN (i.e., a begin-transaction instruction) increments a nesting counter. In these embodiments, each TEND (i.e., an end-transaction instruction) decrements a nesting counter. The TXEND_INSIGHT is only asserted when the nesting counter returns to zero. Similarly, only the first TBEGIN (e.g., nesting counter going from 0 to 1) resets TXEND_INSIGHT and resets the metric, if a metric is maintained.

In some embodiments of the present invention, where truly nested instructions are maintained, multiple TXEND_INSIGHT values are also maintained, and multiple nesting metrics can be maintained, e.g., with a single metric which counts from the beginning of the first transaction. An instruction can determine its distance from a plurality of one selected (e.g., innermost or outermost transaction) by subtracting its own metric of the corresponding TEND's metric. Each TXEND_INSIGHT is reset either at the beginning of the first transaction TBEGIN, or is invalid until the corresponding transaction begins, and is reset by the TBEGIN associated with that transaction.

In some embodiments of the present invention, a counter is maintained for each transaction relative to its innermost TBEGIN. Offset adjusts can be made available to add to that count to get distance from each of the other transactions, by recording the metric of the TBEGIN relative to its outer transaction.

Some embodiments of the present invention modify the behavior of the processing of a transaction when it is close to the end of being processed. In the examples provided herein, the modified behavior is to transmit a "TXEND_INSIGHT;" however, when handling an interference, instruction execution behaviors may be modified in other ways now known or to be known in the future.

Some embodiments of the present invention may include one, or more, of the following features, characteristics and/or advantages: (i) because no new or additional program instructions are required, no instruction bandwidth is wasted; (ii) because no new or additional program instructions are required, legacy programs can be enabled; and/or (iii) because no new or additional program instructions are required, newly written programs will be backwardly compatible with older hardware architecture.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

User/subscriber: includes, but is not necessarily limited to, the following: (i) a single individual human; (ii) an artificial intelligence entity with sufficient intelligence to act as a user or subscriber; and/or (iii) a group of related users or subscribers.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A method for enabling end of transaction detection using speculative look ahead, the method comprising:
setting an indicator to indicate a current transaction is being processed;
monitoring a speculative look ahead operation to detect whether an end-transaction instruction corresponding to the current transaction is likely to occur;
responsive to detecting the end-transaction instruction, enabling a near-end-transaction processing mode;
receiving a notification of an interference corresponding to the current transaction and a second computer process, wherein the notification of the interference further includes an abort request for the current transaction;
determining an interference action;
deferring a response to the request responsive to detecting the end-transaction instruction and responsive to a request for a memory location; and
responsive to the notification of an interference, deferring a transaction abort.

2. The method of claim 1, wherein the current transaction comprises a begin-transaction instruction and program instructions immediately following the begin-transaction instruction up to, and including, the end-transaction instruction, wherein the end-transaction instruction corresponds to the begin-transaction instruction.

3. The method of claim 1, wherein the speculative look ahead operation comprises decoding one or more program instructions prior to executing the one or more program instructions.

4. The method of claim 1, further including completing the current transaction; and
providing a response to the request when the current transaction has completed.

5. The method of claim 1 further including determining a possibility of a deadlock; and
aborting the current transaction based on the possibility of a deadlock.

6. The method of claim 1, wherein enabling the near-end transaction processing mode includes modifying an execution behavior of the current transaction.

7. The method of claim 6, wherein modifying the execution behavior includes transmitting a near-end transaction indication.

8. A computer program product for enabling end of transaction detection using speculative look ahead, the computer program product comprising a computer readable storage medium having stored thereon:
first program instructions programmed to set an indicator to indicate a current transaction is being processed;
second program instructions programmed to monitor a speculative look ahead operation to detect whether an end-transaction instruction corresponding to the current transaction is likely to occur;
third program instructions programmed to, responsive to detecting the end-transaction instruction, enable a near-end-transaction processing mode;
fourth program instructions programmed to receive a notification of an interference corresponding to the current transaction and a second computer process, wherein the notification of the interference further includes an abort request for the current transaction;
fifth program instructions programmed to determine an interference action;
sixth program instructions programmed to defer a response to the request responsive to detecting the end-transaction instruction and responsive to a request for a memory location; and
seventh program instructions programmed to, responsive to the notification of an interference, defer a transaction abort.

9. The computer program product of claim 8, wherein the current transaction comprises a begin-transaction instruction and program instructions immediately following the begin-transaction instruction up to, and including, the end-transaction instruction, wherein the end-transaction instruction corresponds to the begin-transaction instruction.

10. The computer program product of claim 8, wherein the speculative look ahead operation comprises decoding one or more program instructions prior to executing the one or more program instructions.

11. The computer program product of claim 8, further comprising:
eighth program instructions programmed to complete the current transaction; and
ninth program instructions programmed to provide a response to the request when the current transaction has completed.

12. The computer program product of claim 8, further comprising:
eighth program instructions programmed to determine a possibility of a deadlock; and
ninth program instructions programmed to abort the current transaction based on the possibility of a deadlock.

13. A computer system for enabling end of transaction detection using speculative look ahead, the computer system comprising:
a processor set; and
a computer readable storage medium;
wherein:
the processor set is structured, located, connected and/or programmed to run program instructions stored on the computer readable storage medium; and
the program instructions include:
first program instructions programmed to set an indicator to indicate a current transaction is being processed;
second program instructions programmed to monitor a speculative look ahead operation to detect whether an end-transaction instruction corresponding to the current transaction is likely to occur;
third program instructions programmed to, responsive to detecting the end-transaction instruction, enable a near-end-transaction processing mode;
fourth program instructions programmed to receive a notification of an interference corresponding to the current transaction and a second computer process wherein the notification of the interference further includes an abort request for the current transaction;
fifth program instructions programmed to determine an interference action;
sixth program instructions programmed to defer a response to the request responsive to detecting the end-transaction instruction and responsive to a request for a memory location; and
seventh program instructions programmed to, responsive to the notification of an interference, defer the abort of the current transaction.

14. The computer system of claim 13, further comprising:
eighth program instructions programmed to complete the current transaction; and
ninth program instructions programmed to provide a response to the request when the current transaction has completed.

\* \* \* \* \*